US 8,904,328 B2

(12) United States Patent
Terabe

(10) Patent No.: US 8,904,328 B2
(45) Date of Patent: Dec. 2, 2014

(54) SUPPORT APPARATUS AND DESIGN SUPPORT METHOD

(71) Applicant: Fujitsu Limited, Kawasaki-shi, Kanagawa (JP)

(72) Inventor: Miki Terabe, Toyokawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 14/101,973

(22) Filed: Dec. 10, 2013

(65) Prior Publication Data

US 2014/0282333 A1  Sep. 18, 2014

(51) Int. Cl.
*G06F 17/50* (2006.01)

(52) U.S. Cl.
CPC .................. *G06F 17/5068* (2013.01)
USPC .......................................... 716/112

(58) Field of Classification Search
CPC ................. G06F 17/30; G06F 17/50
USPC .......................................... 716/112
See application file for complete search history.

(56) References Cited

U.S. PATENT DOCUMENTS

2006/0111885 A1* 5/2006 Abe .................................. 703/19
2006/0117274 A1* 6/2006 Tseng et al. ....................... 716/1
2008/0235639 A1* 9/2008 Awad et al. ....................... 716/4
2011/0260772 A1* 10/2011 Sicard ........................... 327/427
2012/0299602 A1* 11/2012 Chiu et al. ..................... 324/548

FOREIGN PATENT DOCUMENTS

| JP | 09-325982 | 12/1997 |
| JP | 2001-101245 | 4/2001 |
| JP | 2006-031297 | 2/2006 |
| JP | 2006-146595 | 6/2006 |

* cited by examiner

*Primary Examiner* — Vuthe Siek
*Assistant Examiner* — Mohammed Alam
(74) *Attorney, Agent, or Firm* — Fujitsu Patent Center

(57) ABSTRACT

A design support apparatus includes a detecting unit and a removing unit. The detecting unit detects a resistor whose terminals are open except one terminal and which has a resistance less than or equal to a threshold, from among resistors included in a circuit model representing a circuit. The removing unit removes the detected resistor from the circuit model.

7 Claims, 22 Drawing Sheets

SHORT-CIRCUIT LOW-RESISTANCE RESISTOR

SUPPORT APPARATUS AND DESIGN SUPPORT METHOD

CROSS-REFERENCE TO RELATED APPLICATION

This application is based upon and claims the benefit of priority of the prior Japanese Patent Application No. 2013-054773, filed on Mar. 18, 2013, the entire contents of which are incorporated herein by reference.

FIELD

The embodiments discussed herein are related to a design support apparatus and a design support method.

BACKGROUND

When developing electronic circuits, circuit analysis is often carried out in the design stage. The circuit analysis includes timing analysis, for example. The timing analysis involves simulating the circuit behavior, and verifying whether the circuit operates at the desired timing. By performing timing analysis, it is possible to detect timing errors due to wiring delay, for example, and to modify the circuit so as to prevent timing errors. As the size of the circuit increases, it becomes more difficult to design the circuit to satisfy the timing requirements. Accordingly, it is important to perform timing analysis and determine whether there is a timing error. For example, in the case of macros used in an ultrahigh-speed large-scale integration (LSI) having a clock frequency higher than several gigahertzes, timing analysis needs to be performed with very high accuracy. Note that the term "macro" as used herein refers to a functional circuit block of the LSI.

As a method of circuit timing analysis, simulation-based analysis is known that uses software called Simulation Program with Integrated Circuit Emphasis (SPICE), for example. With simulation using the software SPICE or the like, it is possible to perform timing analysis with high accuracy. However, it takes a considerable amount of time to perform accurate timing analysis. For example, as for extremely large mega macros, it is difficult to complete timing analysis within a practical length of time.

In view of the above, there has been proposed a method of performing simulation on a simplified circuit. For example, there has been proposed a technique of simplifying a large-scale load circuit by using a virtual control voltage source (see, for example, Japanese Laid-open Patent Publication No. 2006-146595).

There has also been proposed a technique of eliminating open ends of elements or eliminating nodes having no direct-current path so as to improve the analysis accuracy without needlessly increasing the processing load of circuit simulation. This technique removes, from among associated elements having open ends, every associated element all of whose terminals or all of whose terminals except one are open ends (see, for example, Japanese Laid-open Patent Publication No. 9-325982).

However, with the conventional technique of simplifying a circuit model, the accuracy of timing analysis might be reduced due to over-simplification of the circuit model. For instance, if every element all of whose terminals or all of whose terminals except one are open ends is removed, even an element that greatly affects the timing analysis might be removed. If an element that greatly affects the timing analysis is removed, an error corresponding to the degree that the element affects the operation timing of the actual circuit might occur in the results of the timing analysis. Thus, the analysis accuracy is reduced.

The problem of reduced analysis accuracy due to over-simplification of the circuit model occurs not only in timing analysis, but also in other analyses.

SUMMARY

According to one aspect of the invention, there is provided a design support apparatus that includes a processor configured to perform a procedure including: detecting a resistor whose terminals are open except one terminal and which has a resistance less than or equal to a threshold, from among resistors included in a circuit model representing a circuit; and removing the detected resistor from the circuit model.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
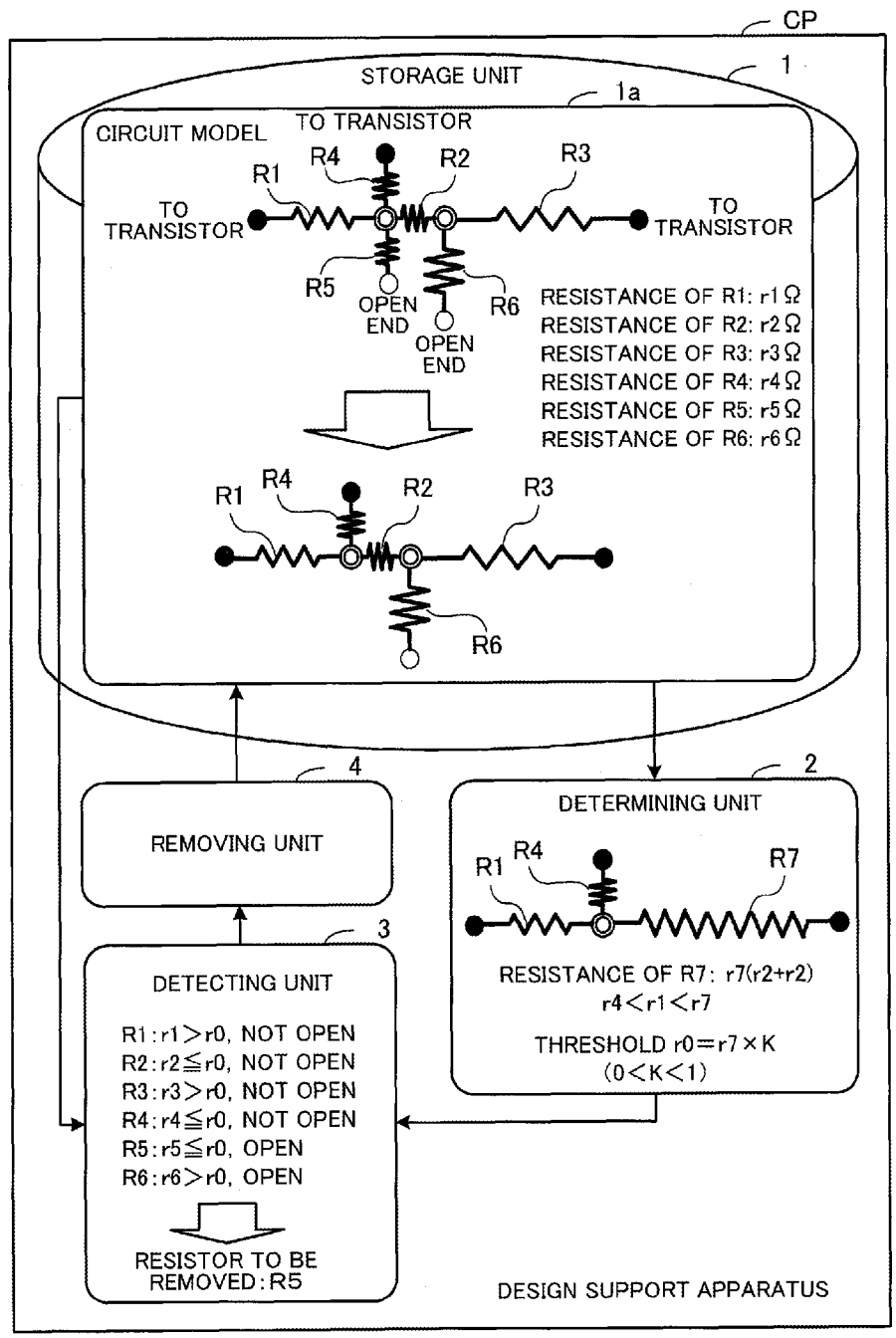
FIG. 1 illustrates functions of a design support apparatus according to a first embodiment.

Embodiments will be described below with reference to the accompanying drawings, wherein like reference numerals refer to like elements throughout. Features described in association with different embodiments may be combined without departing from the scope of the disclosure.

(a) First Embodiment

First, a description will be given of a first embodiment. According to the first embodiment, a design support apparatus detects a resistor whose terminals are open except one terminal, from among resistors included in a circuit model generated by modeling a circuit. If the resistance of the detected resistor is less than or equal to a threshold, the design support apparatus deletes data of the resistor from the circuit model. Note that when a terminal is "open", the terminal is not connected to another element, the power source, or ground, for example. A resistor whose terminals are open except one terminal is hereinafter referred to as an "open resistor". According to the first embodiment, it is possible to appropriately simplify a circuit model while achieving an allowable level of analysis accuracy.

Note that in a circuit model, wires in the circuit are represented as elements such as resistors and the like in small segments. Accordingly, "resistors" in the circuit model may include not only resistors and the like provided as electronic components, but also wires.

FIG. 1 illustrates functions of a design support apparatus CP according to the first embodiment. The design support apparatus CP includes a storage unit 1, a determining unit 2, a detecting unit 3, and a removing unit 4.

The storage unit 1 stores a circuit model 1a representing an electronic circuit. The circuit model 1a includes a plurality of resistors R1 through R6, for example. In the circuit model 1a, the resistances of the respective resistors R1 through R6 are set. In the example of FIG. 1, the resistances of the resistors R1, R2, R3, R4, R5, and R6 are set to r1 Ω, r2 Ω, r3 Ω, r4 Ω, r5 Ω, and r6 Ω, respectively.

The determining unit 2 determines a threshold on the basis of the analysis accuracy in the simulation of the circuit behavior using the circuit model 1a. For example, the determining unit 2 reduces the threshold as the analysis accuracy increases. The determining unit 2 also determines, for each one or more partial circuits included in the circuit model 1a, a threshold in accordance with the circuit configuration of the partial circuit. Accordingly, the determining unit 2 calculates, for the partial circuit, the combined resistance of a plurality of resistors that are connected in parallel or series, under the condition that all the resistors whose terminals are open except one terminal are removed. Then, the determining unit 2 determines a threshold to be applied to the partial circuit on the basis of the combined resistance.

In the case of determining a threshold for each of the plurality of partial circuits, a coefficient corresponding to the analysis accuracy needed for simulation of the circuit behavior may be defined in advance. In this case, the determining unit 2 multiplies a value calculated on the basis of the resistance in the partial circuit by the coefficient, and sets the multiplication result as the threshold for the partial circuit. For example, the determining unit 2 compares, for the partial circuit, the combined resistance of a plurality of resistors that are connected in parallel or series and the respective resistances of resistors that are not connected in parallel or series, under the condition that all the resistors whose terminals are open except one terminal are removed. Then, the determining unit 2 multiplies the highest resistance among the compared resistances by the coefficient, and sets the multiplication result as the threshold of the partial circuit.

The detecting unit 3 detects a resistor whose terminals are open except one terminal and which has a resistance less than or equal to the threshold, from among the resistors R1 through R6 included in the circuit model 1a. In the case where a threshold is determined for each of the plurality of partial circuits, the detecting unit 3 detects a resistor whose terminals are open except one terminal and which has a resistance less than or equal to the threshold determined for the partial circuit that includes the resistor, for example.

The removing unit 4 removes the resistor detected by the detecting unit 3 from the circuit model 1a.

With this design support apparatus CP, the circuit model 1a is simplified. For instance, in the example of FIG. 1, the determining unit 2 determines a threshold. For example, the determining unit 2 calculates the combined resistance of segments where a plurality of resistors are connected, under the condition that all the open resistors are removed from the circuit model 1a. In the example of FIG. 1, among the resistors R1 through R6 in the circuit model 1a, the resistors R5 and R6 are open resistors. Accordingly, the determining unit 2 generates a copy of the circuit model 1a, and removes the resistors R5 and R6 from the copy. Since the resistors R2 and R3 are connected in series, the resistors R2 and R3 are replaced with a resistor R7 having a combined resistance r7 (r7=r2+r3) of the resistances R2 and R3. Then, the resistances of the resistors R1, R4, and R7 are compared with each other so as to find the highest resistance. In the example of FIG. 1, r4<r1<r7, and hence the resistance of the resistor R7 is the highest. Accordingly, a value obtained by multiplying the resistance r7 by a coefficient K corresponding to the analysis accuracy is set as the threshold.

When the threshold is determined, the detecting unit 3 detects a resistor that satisfies the conditions for removal, from the circuit model 1a. The conditions for removal include that the resistance is less than or equal to the threshold, and that the resistor is an open resistor. In the example of FIG. 1, the resistors R2, R4, and R5 have resistances less than or equal to a threshold r0. Further, the resistors R5 and R6 are open resistors. Then, only the resistor R5 satisfies the conditions for removal. Thus, the detecting unit 3 detects the resistor R5 as a resistor to be removed. Then, the removing unit 4 removes the resistor R5 from the circuit model 1a.

In this way, among open resistors, only a resistor having a resistance less than or equal to the threshold is removed from the circuit model 1a. Thus, it is possible to simplify the circuit model 1a while preventing over-simplification. That is, by determining the threshold in accordance with the accuracy of the analysis of circuit characteristics using the circuit model 1a, it becomes possible to appropriately simplify the circuit model 1a in accordance with the analysis accuracy. Then, if the circuit characteristics are analyzed using the thus simplified circuit model 1a, it is possible to perform effective analysis while achieving the accuracy needed for the analysis.

Although the threshold is calculated by the determining unit 2 in the first embodiment, the threshold may be set in advance by the user.

The determining unit 2, the detecting unit 3, and the removing unit 4 may be realized by the processor of the design support apparatus CP, for example. The storage unit 1 may be realized by a random access memory (RAM) of the design support apparatus CP, for example.

The lines connecting the components of FIG. 1 represent some of communication paths. Communication paths other than those of FIG. 1 may be provided.

(b) Second Embodiment

Next, a description will be given of a second embodiment. In the second embodiment, the following two improvements are introduced so as to generate a simplified circuit model that makes it possible to perform accurate timing analysis within a practical length of time.

In order to simplify a circuit model for timing analysis, first a combined resistance is calculated under the condition that all the open resistors are short-circuited. Then, the highest resistance is calculated for each netlist. On the basis of the highest resistance, a threshold for removing a resistor is determined for each netlist in accordance with the accuracy of timing analysis.

On the basis of the determined threshold, only an open resistor that does not greatly affect the timing analysis is short-circuited in the original circuit model.

The term "netlist" as used herein refers to a set of resistors that connect two or more transistors in the circuit model. The netlist is an example of the partial circuit described in the first embodiment.

In the second embodiment, short-circuiting of an open resistor having a resistance less than or equal to the threshold and another method of simplifying a circuit model are combined. Examples of another method of simplifying a circuit model include a method of abstracting a model and a method of degenerating a model.

Abstraction of a circuit model involves short-circuiting a low-resistance resistor, removing a capacitor, and short-circuiting a resistor having a specific circuit shape, for example. Short-circuiting of a resistor and degeneration of resistors are defined as follows.

Definition of "short-circuiting of a resistor": Recognize a resistive element as not being present (0Ω), and join the nodes at the opposite ends.

Definition of "degeneration of resistors": Replace resistors with a combined resistor in accordance with the Ohm's law.

Figure 2:
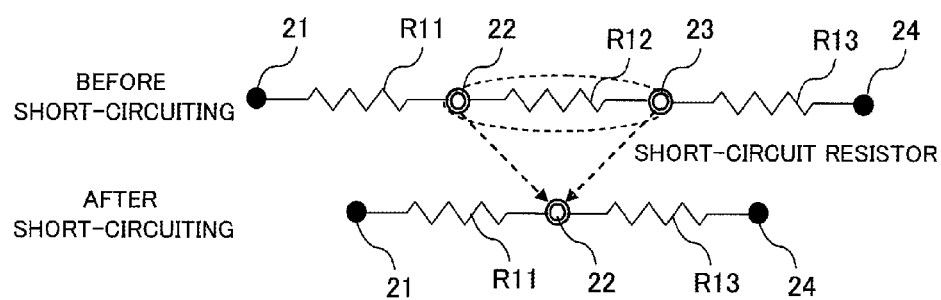
FIG. 2 illustrates an example of short-circuiting a resistor.

FIG. 2 illustrates an example of short-circuiting a resistor. The upper side of FIG. 2 illustrates the circuit before short-circuiting, and the lower side of FIG. 2 illustrates the circuit after short-circuiting.

In FIG. 2, in the circuit before short-circuiting, three resistors R11, R12, and R13 are connected in series. The resistor R11 is disposed between a node 21 and a node 22. The resistor R12 is disposed between the node 22 and a node 23. The resistor R13 is disposed between the node 23 and a node 24.

It is now assumed that the resistor R12 is short-circuited. In the case of short-circuiting the resistor R12, the resistor R12 is removed, and the nodes 22 and 23 are joined together. For example, the resistor R13 connected to the node 23 is connected to the node 22 in place of the node 23.

In this way, the resistor is short-circuited. Short-circuiting of a resistor reduces the number of resistors in the circuit. Thus, the amount of calculation in the timing analysis is reduced.

Abstraction of a model is performed on an element that does not greatly affect the accuracy of the timing analysis. For example, processing such as short-circuiting and the like is performed on elements described below.

Short-circuiting a wiring resistor having a low resistance
Removing a wiring capacitor having a low capacitance
Short-circuiting an open resistor having a resistance less than or equal to a threshold A determination as to whether the resistance is low is made on the basis of whether the resistance is less than a preset value. A determination as to whether the capacitance is low is made on the basis of whether the capacitance is less than a preset value.

Methods of simplifying a circuit model include degeneration of a model, other than abstraction of a model. Degeneration of a model refers to degenerating wiring resistors, wiring capacitors, and the like, in accordance with the Ohm's law.

Figure 3:
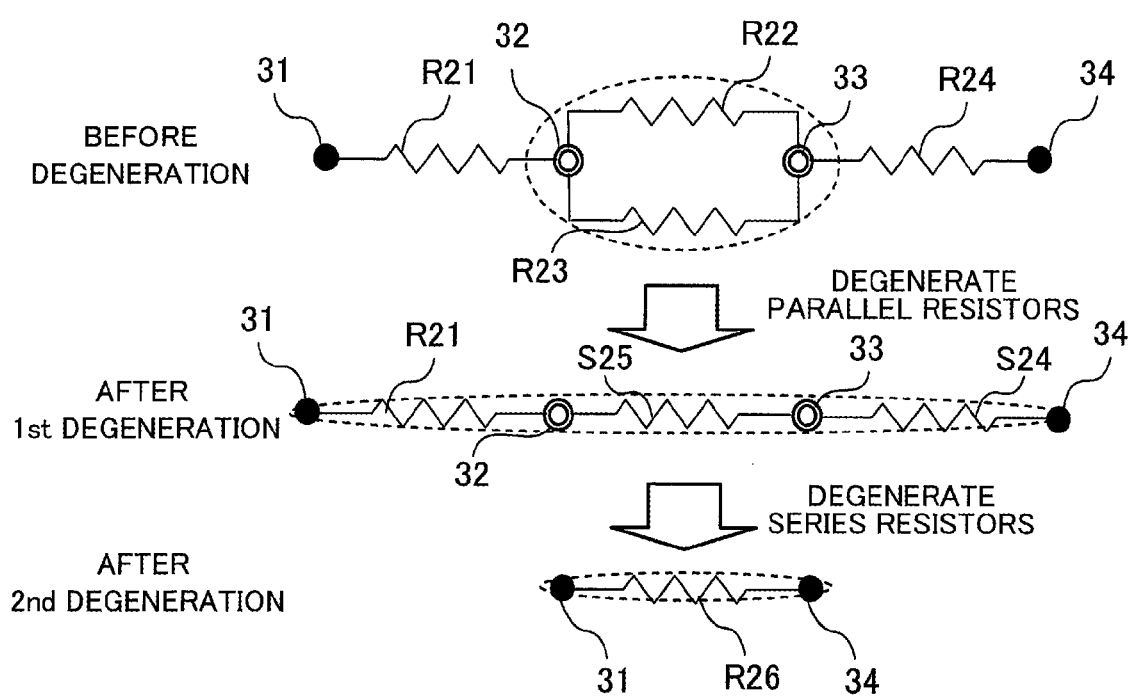
FIG. 3 illustrates an example of degenerating resistors.

FIG. 3 illustrates an example of degenerating resistors. In FIG. 3, degeneration of resistors is performed in two steps. The first degeneration is for degenerating parallel resistors, and the second degeneration is for degenerating series resistors. In FIG. 3, the circuit before degeneration, the circuit after the first degeneration, and the circuit after the second degeneration are illustrated in this order from the top.

The circuit before degeneration includes four resistors R21 through R24. The resistor R21 is disposed between a node 31 and a node 32. The resistors R22 and R23 are disposed between the node 32 and a node 33. The resistor R24 is disposed between the node 33 and a node 34.

When the circuit before degeneration undergoes degeneration of parallel resistors, the resistors R23 and R24 are replaced with a single resistor R25. The resistor R25 is disposed between the nodes 32 and 33. As a result, in the circuit after the first degeneration, the resistors R21, R25, and R24 are connected in series. The resistance of the resistor R25 is equal to the combined resistance of the resistors R23 and R24. The combined resistance in parallel is calculated by dividing the product of the resistance of all the parallel-connected resistors by the sum of the resistance of these resistors.

When the circuit after the first degeneration undergoes degeneration of series-connected resistors, the resistors R21, R25, and R24 are replaced with a single resistor R26. The resistor R26 is disposed between the nodes 31 and 34 at the opposite ends of the circuit before degeneration. The resistance of the resistor R26 is equal to the combined resistance of the resistors R21, R25, and R24. The combined resistance in series is the sum of the resistance of all the series-connected resistors.

In this way, the resistors are degenerated. As in the case of short-circuiting of a resistor, degeneration of resistors also reduces the number of resistors in the circuit. As a result, the amount of calculation in the timing analysis is reduced.

As described above, it is possible to simplify the circuit model by abstracting and degenerating the circuit model. However, in particular, open wiring resistors often become the factor that prevents degeneration of wiring resistors.

Figure 4:
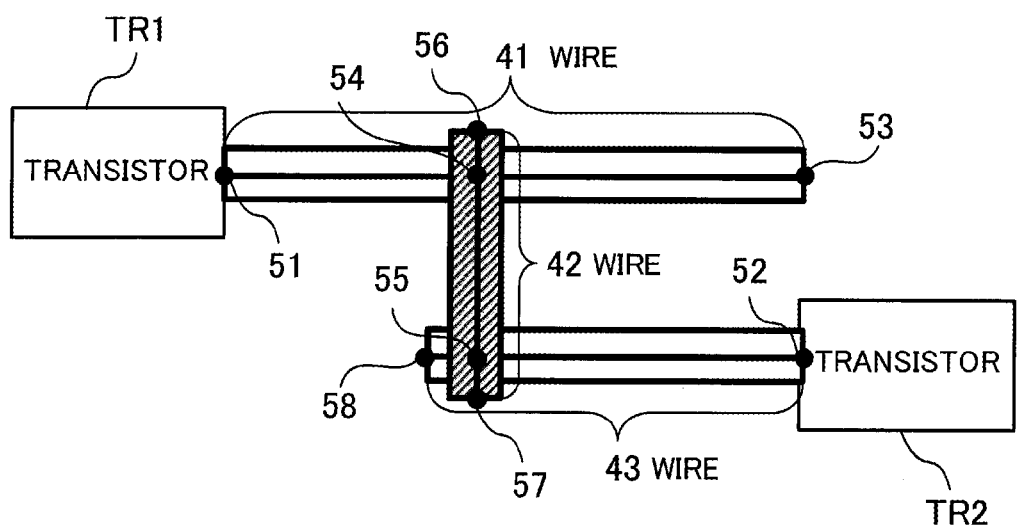
FIG. 4 illustrates an example of a circuit including an open wiring resistor.

FIG. 4 illustrates an example of a circuit including an open wiring resistor. In the circuit of FIG. 4, two transistors TR1 and TR2 are connected through three wires 41 through 43. The transistor TR1 is connected to the wire 41, and the transistor TR2 is connected to the wire 43. The wire 41 and the wire 43 are connected through a wire 42.

In the case of creating a circuit model for this circuit, nodes 51 through 58 are provided in order to define the wires 41 through 43. For example, two nodes 51 and 53 are provided at the opposite ends of the wire 41. Two nodes 56 and 57 are provided at the opposite ends of the wire 42. Two nodes 52 and 58 are provided at the opposite ends of the wire 43. Further, a node 54 is provided at the center of the intersection of the wire 41 and the wire 42. A node 55 is provided at the center of the intersection of the wire 43 and the wire 42.

Each wiring resistor between the nodes provided on the wires is represented as a resistive element in the circuit model.

Figure 5:
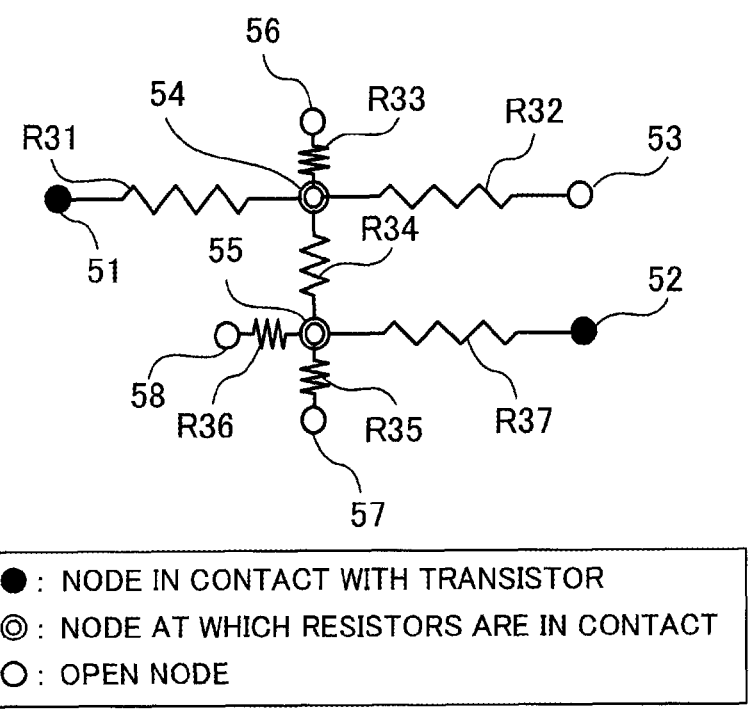
FIG. 5 illustrates an example of a circuit model of a circuit including an open wiring resistor.

FIG. 5 illustrates an example of a circuit model of the circuit including an open wiring resistor. The circuit model of FIG. 5 is generated from the circuit of FIG. 4.

In the circuit model, the wire between the nodes 51 and 54 is represented as a resistor R31. The wire between the nodes 54 and 53 is represented as a resistor R32. The wire between the nodes 54 and 56 is represented as a resistor R33. The wire between the nodes 54 and 55 is represented as a resistor R34. The wire between the nodes 55 and 57 is represented as a resistor R35. The wire between the nodes 55 and 58 is represented as a resistor R36. The wire between the nodes 52 and 55 is represented as a resistor R37.

In FIG. 5, the nodes 51 and 52 in contact with the transistors TR1 and TR2, respectively, are indicated by black circles. The nodes 54 and 55 at which resistors representing wires are connected are indicated by double circles. The open nodes 53, 56, 57, and 58 are indicated by white circles. These symbols of nodes are also used in FIGS. 17 through 22.

Since the resistors R32, R33, R35, and R36 connected to the open nodes 53, 56, 57, and 58, respectively, are present, it is not possible to degenerate the circuit model of FIG. 5. If the circuit model may be simplified by short-circuiting the resistors R32, R33, R35, and R36, it becomes possible to degenerate the circuit model.

Figure 6:
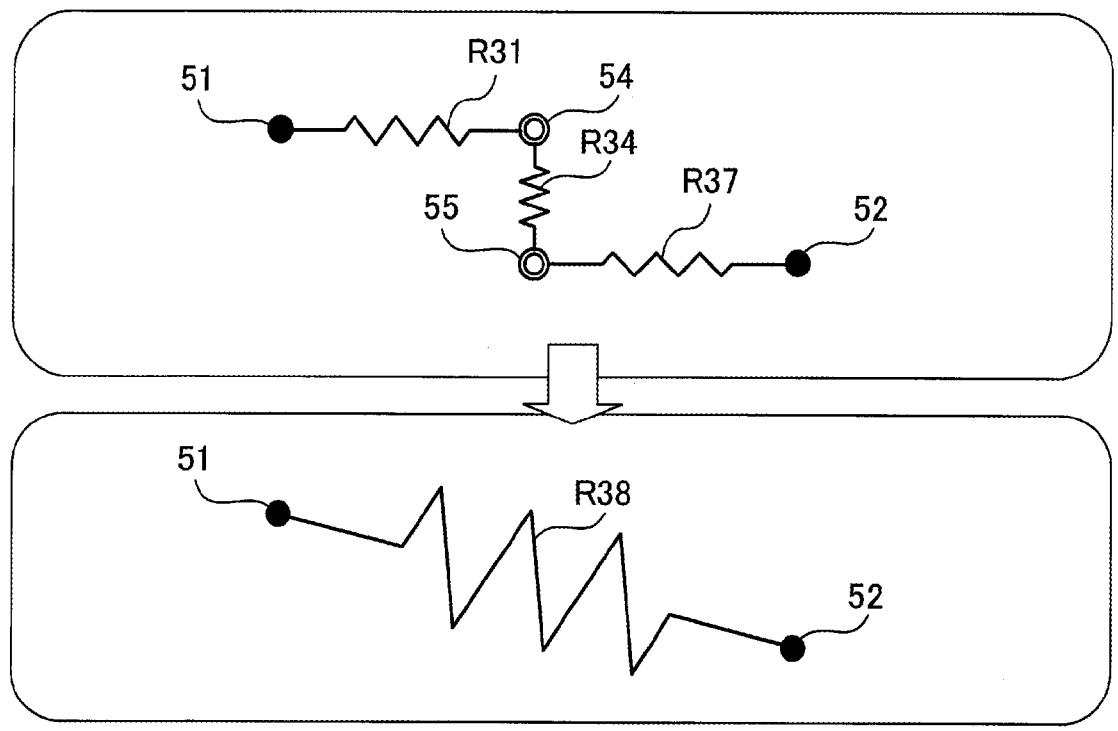
FIG. 6 illustrates an example of simplifying a circuit model.

FIG. 6 illustrates an example of simplifying the circuit model. When the resistors R32, R33, R35, and R36 connected to the open nodes 53, 56, 57, and 58, respectively, are short-circuited, a circuit model illustrated at the upper side of FIG. 6 is obtained. In this circuit model, three resistors R31, R34, and R37 are connected in series. Thus, it becomes possible to degenerate resistors.

The lower side of FIG. 6 illustrates the circuit model after degeneration of resistors. The three resistors R31, R34, and R37 are degenerated and replaced with a single resistor R38. The resistance of the resistor R38 is equal to the combined resistance of the three resistors R31, R34, and R37.

In this way, by short-circuiting as many open resistors as possible and thereby removing the resistors from the circuit model, further simplification of the circuit model is achieved. However, in the field of timing analysis, simulation needs to be performed with high accuracy. Therefore, over-simplification of the circuit model might cause a difference from the actual measured values. For example, when there is a resistor in the circuit, the resistor serves as not only a resistor but also a capacitor called a "parasitic capacitor". Thus, although direct current does not flow through the open resistor, the open resistor serves as a low-capacitance capacitor and affects the behavior of the circuit. That is, for performing timing analysis with high accuracy, it is not appropriate to remove a resistor from the circuit model simply because the resistor is open.

In the circuit of FIG. 4, among wire segments replaced with open resistors, the wire segment between the nodes 53 and 54 has a greater length and a greater resistance than the other wire segments. In the case where the accuracy needed for timing analysis is low, the resistor corresponding to the wire segment between the nodes 53 and 54 may be removed from the circuit model. On the other hand, in the case where timing analysis needs to be performed with high accuracy, if a resistor having a resistance above a certain level is removed from the circuit model, effects of the presence of the resistor, such as the parasitic capacitance, are not reflected on the timing analysis. Thus, the needed level of analysis accuracy might not be achieved. Accordingly, in the second embodiment, a resistance threshold is provided. Thus, an open resistor having a resistance less than or equal to the threshold is short-circuited, while the other open resistors are prevented from being short-circuited.

Figure 7:
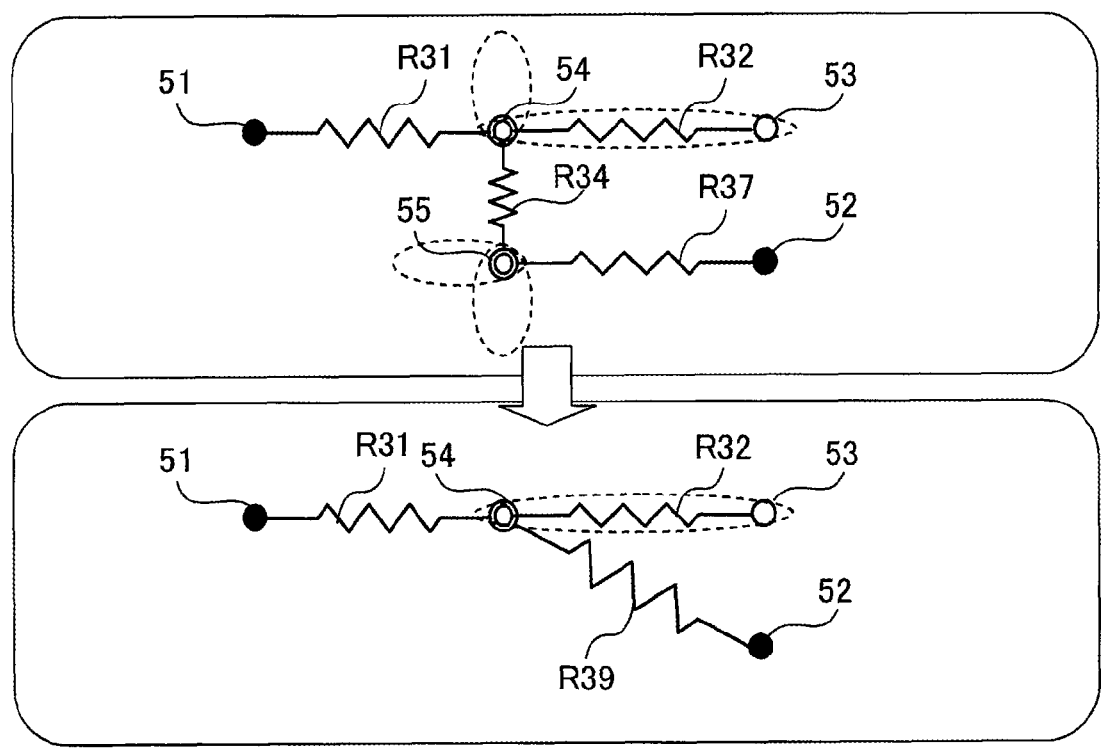
FIG. 7 illustrates an example of simplifying a circuit model without removing an open resistor having a resistance greater than a threshold.

FIG. 7 illustrates an example of simplifying the circuit model without removing an open resistor having a resistance greater than a threshold. In the example of FIG. 7, among open resistors, only the resistor R32 has a resistance greater than the threshold. The upper side of FIG. 7 illustrates the circuit model obtained after open resistors having resistances less than or equal to the threshold are short-circuited. In this example, although the resistors R33, R35, and R36 of FIG. 5 are removed, the resistor R32 remains in the circuit model without being short-circuited. Further, the resistors R34 and R37 are connected in series, and therefore may be degenerated.

The lower side of FIG. 7 illustrates the circuit model after degeneration of resistors. The two resistors R34 and R37 are degenerated and replaced with a single resistor R39. The resistance of the resistor R39 is equal to the combined resistance of the two resistors R34 and R37.

In this way, a resistor having a resistance greater than a predetermined threshold is excluded from resistors to be short-circuited even if the resistor is open. Thus, it becomes possible to sufficiently simplify the circuit model while preventing a reduction in the accuracy of timing analysis.

The threshold for determining whether to short-circuit an open resistor may be determined in accordance with the analysis accuracy needed for timing analysis, for example. The analysis accuracy needed for timing analysis is not always constant across the circuit. In particular, in the case of performing timing analysis of a large-size LSI circuit, different levels of analysis accuracy need to be achieved for different netlists in the circuit. Accordingly, in the second embodiment, the threshold for determining whether to short-circuit an open resistor is determined for each netlist.

Figure 8:
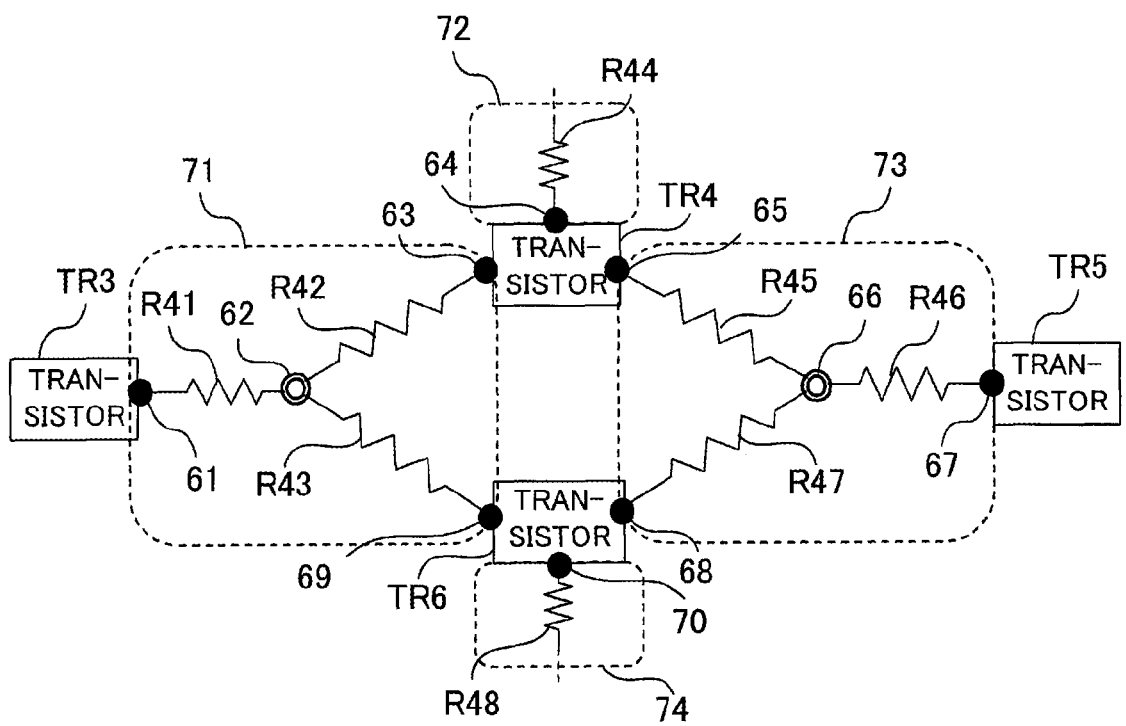
FIG. 8 illustrates examples of netlists included in a circuit model.

FIG. 8 illustrates examples of netlists included in a circuit model. The circuit model of FIG. 8 includes four transistors TR3 through TR6. Resistors R41 through R48 are connected to the transistors TR3 through TR6 via nodes 61 through 70.

The transistors TR3, TR4, and TR6 are connected through the three resistors R41 through R43. That is, the three resistors R41 through R43 connecting the transistors TR3, TR4, and TR6 form a netlist 71. Similarly, the circuit model of FIG. 8 includes netlists 72 through 74.

The function of simplifying a circuit model while preventing a reduction in analysis accuracy may be implemented by software executed by a computer that creates a circuit model and performs timing analysis.

Figure 9:
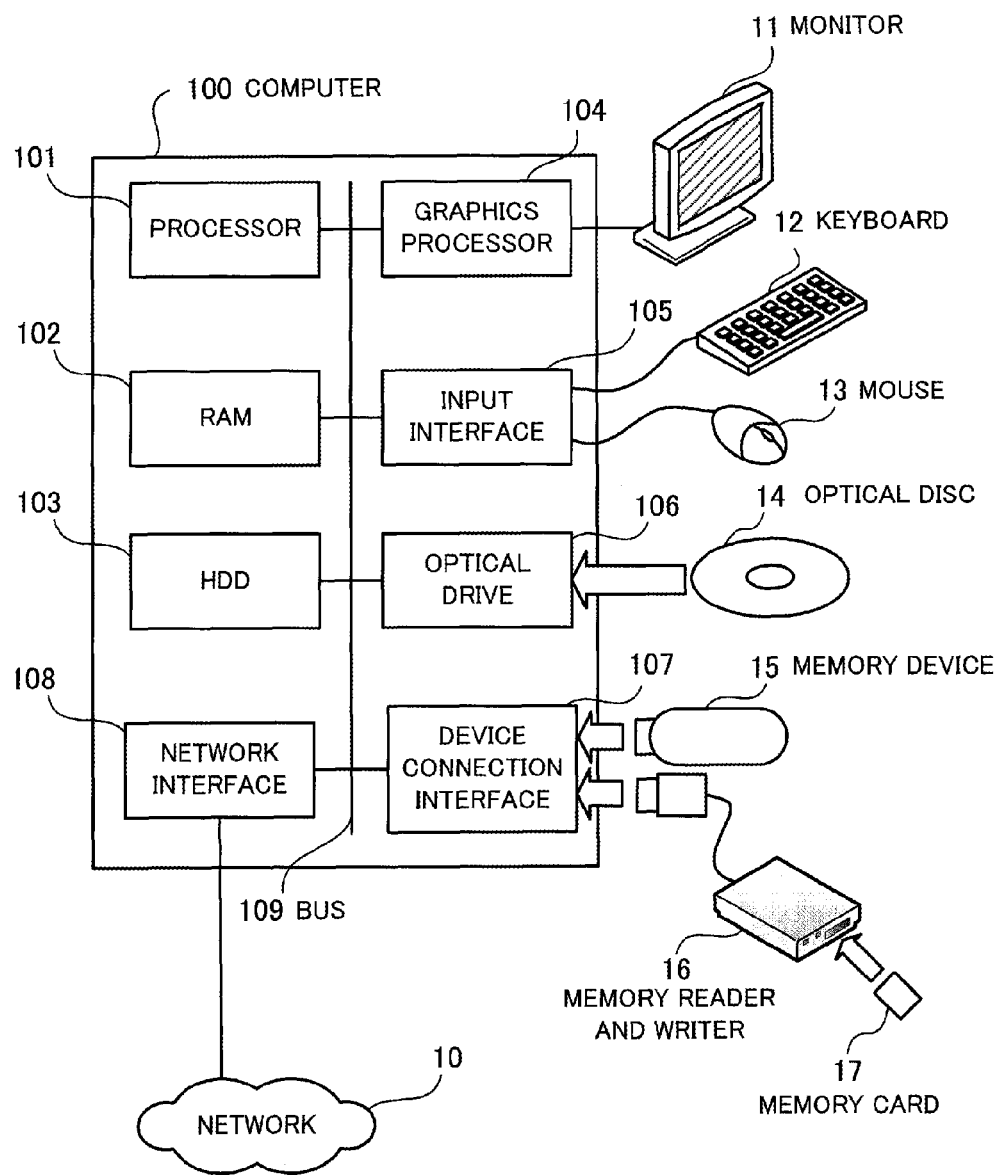
FIG. 9 illustrates an exemplary hardware configuration of a computer used in a second embodiment.

FIG. 9 illustrates an exemplary hardware configuration of a computer 100 used in the second embodiment. The entire operation of the computer 100 is controlled by a processor 101. A RAM 102 and a plurality of peripheral devices are connected to the processor 101 via a bus 109. The processor 101 may be a multiprocessor. Examples of the processor 101 include a central processing unit (CPU), a micro processing unit (MPU), a digital signal processor (DSP), and the like. The functions of the processor 101 may be implemented wholly or partly by using electronic circuits such as an application-specific integrated circuit (ASIC), a programmable logic device (PLD), and the like.

The RAM 102 serves as a primary storage device of the computer 100. The RAM 102 temporarily stores at least part of the operating system (OS) program and application programs that are executed by the processor 101. The RAM 102 also stores various types of data used for processing performed by the processor 101.

The peripheral devices connected to the bus 109 include a hard disk drive (HDD) 103, a graphics processor 104, an input interface 105, an optical drive 106, a device connection interface 107, and a network interface 108.

The HDD 103 magnetically writes data to and reads data from its internal disk. The HDD 103 serves as a secondary storage device of the computer 100. The HDD 103 stores the OS programs, application programs, and various types of data. Note that a semiconductor storage device such as a flash memory may be used as a secondary storage device.

A monitor 11 is connected to the graphics processor 104. The graphics processor 104 displays an image on the screen of the monitor 11 in accordance with a command from the processor 101. Examples of the monitor 11 include a display device using a cathode ray tube (CRT) and a liquid crystal display device.

A keyboard 12 and a mouse 13 are connected to the input interface 105. The input interface 105 receives signals from the keyboard 12 and the mouse 13, and transmits the received signals to the processor 101. The mouse 13 is an example of a pointing device, and other types of pointing devices may also be used. Examples of other types of pointing devices include a touch panel, a tablet, a touch pad, a track ball, and the like.

The optical drive 106 reads data from an optical disc 14 by using laser beams or the like. The optical disc 14 is a portable storage medium and stores data such that the data may be read through optical reflection. Examples of the optical disc 14 include digital versatile disc (DVD), DVD-RAM, compact disc read only memory (CD-ROM), CD-Recordable (CD-R), CD-Rewritable (CD-RW), and the like.

The device connection interface 107 is a communication interface that connects peripheral devices to the computer 100. For example, a memory device 15 and a memory reader and writer 16 may be connected to the device connection interface 107. The memory device 15 is a recording medium having a function to communicate with the device connection interface 107. The memory reader and writer 16 is a device that writes data to and reads data from a memory card 17. The memory card 17 is a card-type recording medium.

The network interface 108 is connected to a network 10. The network interface 108 exchanges data with other computers or communication apparatuses via the network 10.

With the hardware configuration described above, it is possible to realize the processing functions of the second embodiment. Note that the design support apparatus CP of FIG. 1 may be realized with a hardware configuration similar to that of the computer 100 of FIG. 9.

The computer 100 realizes the processing functions of the second embodiment by executing a program stored in a computer-readable recording medium, for example. The program describing the procedure to be performed by the computer 100 may be stored in various recording media. For example, the program to be executed by the computer 100 may be stored in the HDD 103. The processor 101 loads at least part of the program from the HDD 103 into the RAM 102 so as to execute the program. The program to be executed by the computer 100 may be stored in a portable recording medium, such as the optical disc 14, the memory device 15, the memory card 17, and the like. The program stored in the portable recording medium may be executed after being installed into the HDD 103 under the control of the processor 101, for example. Further, the processor 101 may execute the program by reading the program directly from the portable recording medium.

Next, functions of the computer 100 will be described.

Figure 10:
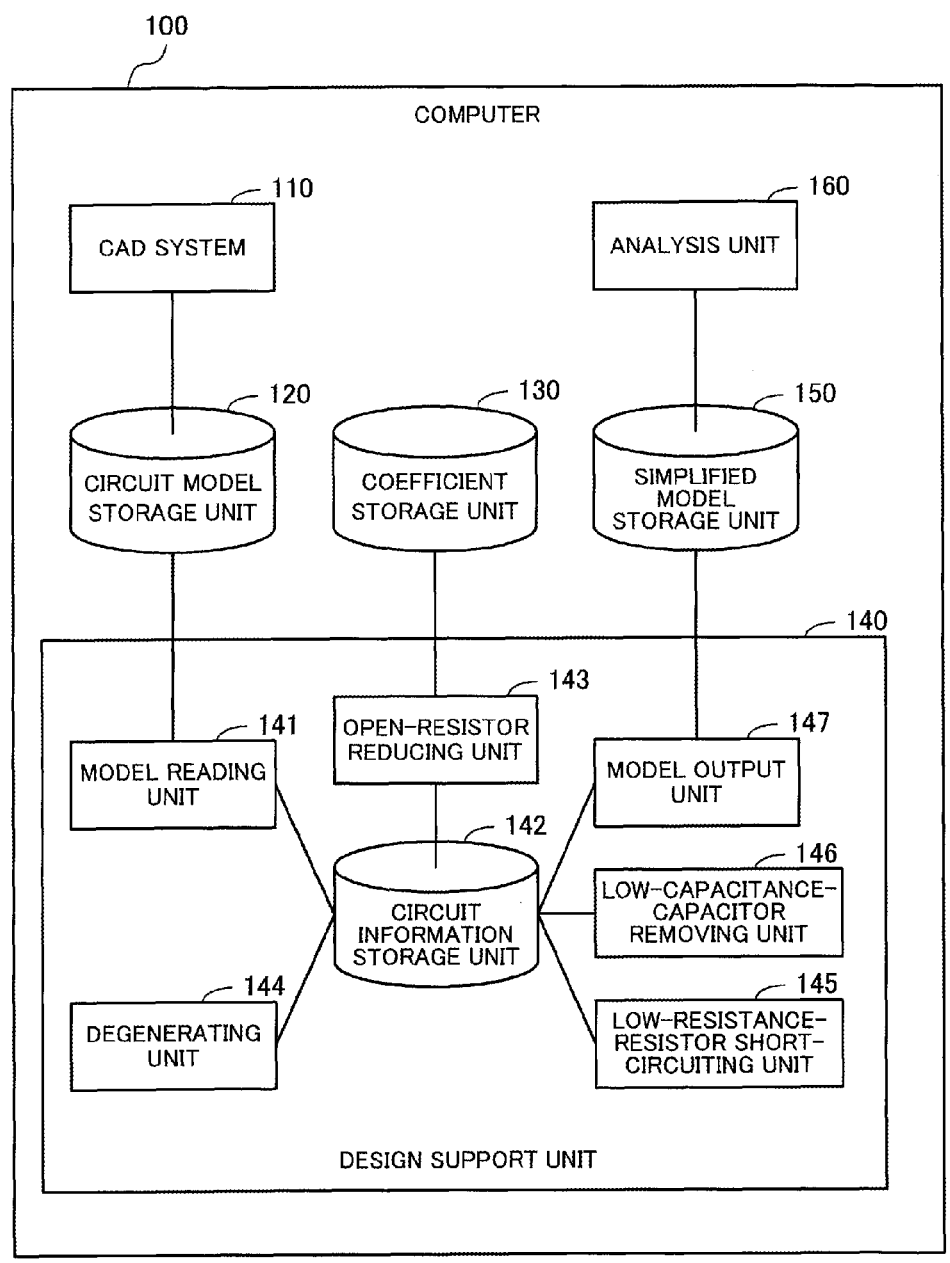
FIG. 10 is a functional block diagram of the computer according to the second embodiment.

FIG. 10 is a functional block diagram of the computer 100 according to the second embodiment. The computer 100 includes a computer aided design (CAD) system 110, a circuit model storage unit 120, a coefficient storage unit 130, a design support unit 140, a simplified model storage unit 150, and an analysis unit 160.

The CAD system 110 designs a circuit such as an LSI and the like using CAD, in accordance with inputs from the user. The CAD system 110 may design macros in the LSI. The CAD system 110 generates a circuit model on the basis of the designed circuit, and stores the circuit model in the circuit model storage unit 120. Note that the circuit model may be in a text file in Spice format, for example.

The circuit model storage unit 120 stores a circuit model representing an electronic circuit such as an LSI and a macro in an LSI. For example, a part of the storage area of the RAM 102 or the HDD 103 serves as the circuit model storage unit 120.

The coefficient storage unit 130 stores a coefficient (analysis accuracy coefficient) corresponding to the accuracy needed for timing analysis of the designed circuit. The higher the needed timing analysis accuracy is, the lower the analysis accuracy coefficient is set to be, for example. In the second embodiment, the analysis accuracy coefficient is a real number greater than 0 and less than 1. The threshold for determining the necessity of short-circuiting an open resistor is determined on the basis of this analysis accuracy coefficient. The analysis accuracy coefficient is stored by the coefficient storage unit 130 by an operation of the user. For example, a part of the storage area of the RAM 102 or the HDD 103 serves as the coefficient storage unit 130.

The design support unit 140 simplifies the circuit model stored in the circuit model storage unit 120 so as to generate a simplified circuit model (simplified model). Then, the design support unit 140 stores the generated simplified model in the simplified model storage unit 150.

The simplified model storage unit 150 stores the simplified model. For example, a part of the storage area of the RAM 102 or the HDD 103 serves as the simplified model storage unit 150.

The analysis unit 160 performs timing analysis of the circuit on the basis of the simplified model stored in the simplified model storage unit 150. For example, the analysis unit 160 allows the user to specify an analysis accuracy needed for timing analysis. Then, the analysis unit 160 performs timing analysis based on the simplified model with the specified accuracy. The timing analysis determines the timing shift amount of operations of the circuit. If any of the operations has a shift amount greater than an allowable shift amount, the analysis unit 160 outputs a timing error.

Next, functions of the design support unit 140 will be described in detail. The design support unit 140 includes a model reading unit 141, a circuit information storage unit 142, an open-resistor reducing unit 143, a degenerating unit 144, a low-resistance-resistor short-circuiting unit 145, a low-capacitance-capacitor removing unit 146, and a model output unit 147.

The model reading unit 141 reads a circuit model from the circuit model storage unit 120. The model reading unit 141 stores the read circuit model in the circuit information storage unit 142.

The circuit information storage unit 142 stores a circuit model to be simplified. For example, a part of the storage area of the RAM 102 or the HDD 103 serves as the circuit information storage unit 142.

The open-resistor reducing unit 143 short-circuits a resistor having a resistance less than or equal to a threshold, among open resistors in the circuit model. When the resistor is short-circuited, the resistor is removed from the circuit model. For example, the open-resistor reducing unit 143 obtains an analysis accuracy coefficient from the coefficient storage unit 130. Then, the open-resistor reducing unit 143 determines a threshold for each netlist on the basis of the obtained analysis accuracy coefficient. Further, the open-resistor reducing unit 143 selects, as a resistor to be short-circuited, a resistor having a resistance less than or equal to the threshold determined for the netlist that includes the resistor, from among a plurality of open resistors included in the circuit model stored in the circuit information storage unit 142. Then, the open-resistor reducing unit 143 updates the circuit model stored in the circuit information storage unit 142 so as to short-circuit the open resistor to be short-circuited.

The degenerating unit 144 degenerates the circuit model after the open resistor having a resistance less than or equal to the threshold is short-circuited. For example, after a process of short-circuiting the open resistor is completed, the degenerating unit 144 detects elements such as resistors or capacitive elements that may be degenerated, from the circuit model in the circuit information storage unit 142. Then, the degenerating unit 144 updates the circuit model in the circuit information storage unit 142 so as to degenerate the detected elements.

The low-resistance-resistor short-circuiting unit 145 short-circuits a resistor having a resistance less than or equal to a predetermined value in the circuit model after the degeneration process. The low-resistance-resistor short-circuiting unit 145 short-circuits a resistor having a low resistance regardless of whether the resistor is open. The predetermined value used as a reference for determining whether the resistance is low is a value less than the threshold for determining whether to short-circuit an open resistor. For example, after the degeneration process is completed, the low-resistance-resistor short-circuiting unit 145 detects a resistor having a low resistance from the circuit model in the circuit information storage unit 142. Then, the low-resistance-resistor short-circuiting unit 145 updates the circuit model in the circuit information storage unit 142 so as to short-circuit the detected element.

The low-capacitance-capacitor removing unit 146 removes a capacitive element having a low capacitance of less than or equal to a predetermined value from the circuit model after the short-circuiting process. For example, after the process of short-circuiting the low-resistance resistor is completed, the low-capacitance-capacitor removing unit 146 detects a capacitive element having a low capacitance from the circuit model in the circuit information storage unit 142. Then, the low-capacitance-capacitor removing unit 146 updates the circuit model in the circuit information storage unit 142 so as to remove the element.

The model output unit 147 outputs a simplified circuit model (simplified model). For example, the model output unit 147 obtains a simplified model from the circuit information storage unit 142, and stores the obtained simplified model in the simplified model storage unit 150.

With the functions described above, it is possible to create a circuit model, simplify the circuit model, and perform timing analysis using the simplified model. Note that the lines connecting the components in FIG. 10 represent some of communication paths. Communication paths other than those of FIG. 10 may be provided. The open-resistor reducing unit 143 is an example of an element having functions of the determining unit 2, the detecting unit 3, and the removing unit 4 of the first embodiment of FIG. 1. The circuit information storage unit 142 is an example of the storage unit 1 of the first embodiment of FIG. 1.

Next, a circuit model created by the CAD system 110 and stored in the circuit model storage unit 120 will be described in detail.

Figure 11:
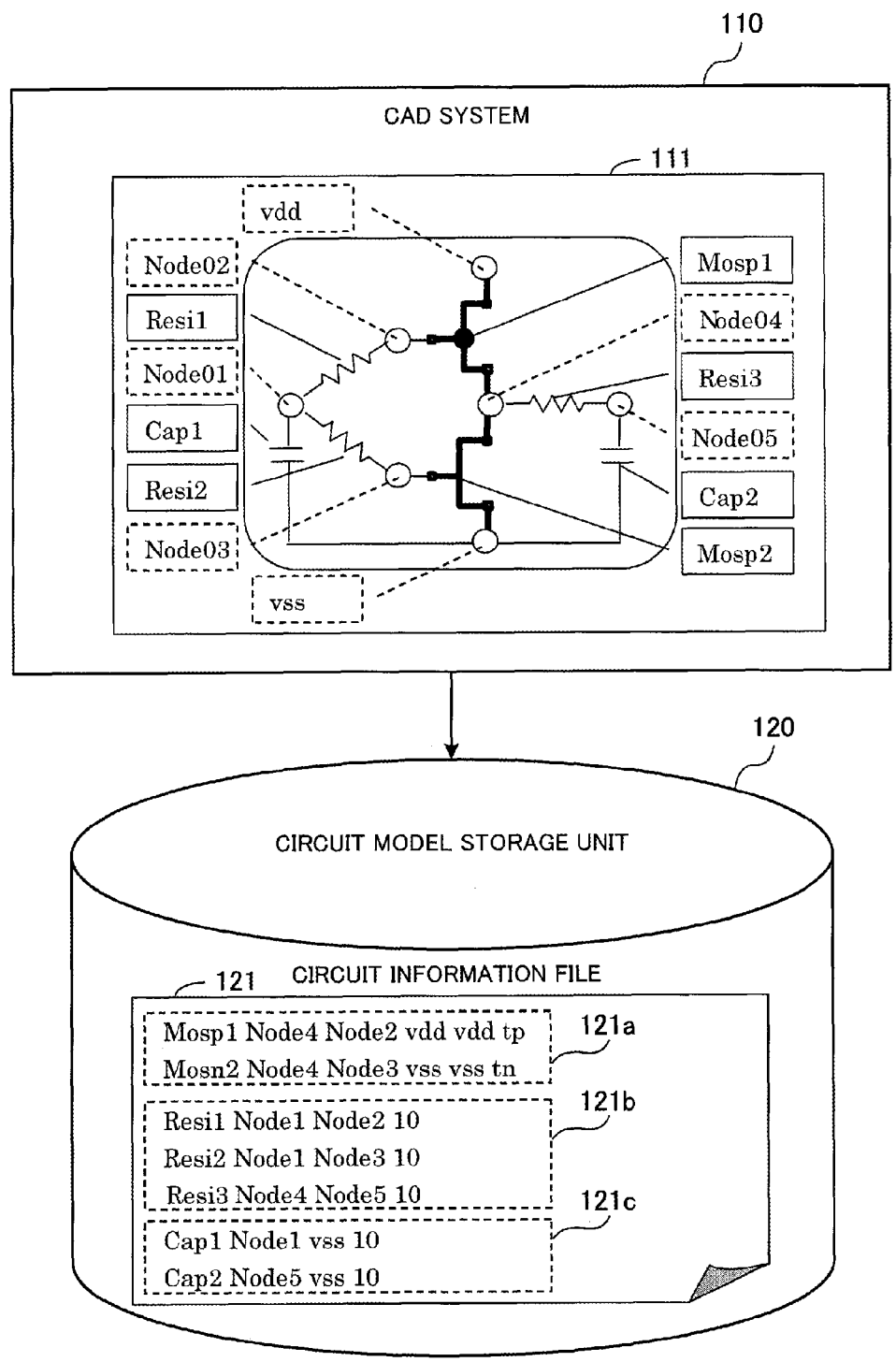
FIG. 11 illustrates an example of the data structure of a circuit model.

FIG. 11 illustrates an example of the data structure of a circuit model. The CAD system 110 designs a circuit such as LSI and the like, in accordance with an operation input from the user. The contents of design include a wiring pattern between elements. The CAD system 110 converts the designed circuit into data as a circuit model. The CAD system 110 is capable of displaying a circuit diagram 111 on the basis of the circuit model. In the circuit diagram 111, elements of the circuit model are represented by symbols. In the circuit model, wires interconnecting elements are represented as resistors, for example. The terminal of each of elements including wires is represented as the location of a node.

The CAD system 110 creates a circuit information file 121 including data of the circuit model represented by the circuit diagram 111. The circuit information file 121 is a file that contains data describing a circuit diagram in a text format, for example. The CAD system 110 stores the created circuit information file 121 in the circuit model storage unit 120.

The circuit information file 121 includes transistor information 121*a*, resistor information 121*b*, and capacitive element information 121*c*, for example. The transistor information 121*a* includes identification information of each transistor included in the circuit model, identification information of each of nodes to which the terminals of the transistor are connected, the type of driving power sources (such as vdd, vss), the type of transistor, and so on. The type of transistor is information indicating whether a metal-oxide-semiconductor field-effect transistor (MOSFET) is p-type or n-type, for example. The resistor information 121*b* includes identification information of each resistor included in the circuit model, identification information of each of nodes to which the terminals of the resistor are connected, the resistance value, and so on. The capacitive element information 121*c* includes identification information of each capacitive element included in the circuit model, identification information of each of nodes to which terminals of the capacitive element are connected, the electric capacitance value, and so on.

Other than information illustrated in FIG. 11, the circuit information file 121 also includes various types of information used for reproducing the circuit model, such as information indicating the location of each node.

Next, the analysis accuracy coefficient stored in the coefficient storage unit 130 will be described. The analysis accuracy coefficient is determined in accordance with the accuracy needed for timing analysis. For example, as the analysis accuracy increases, the analysis accuracy coefficient decreases.

Figure 12:
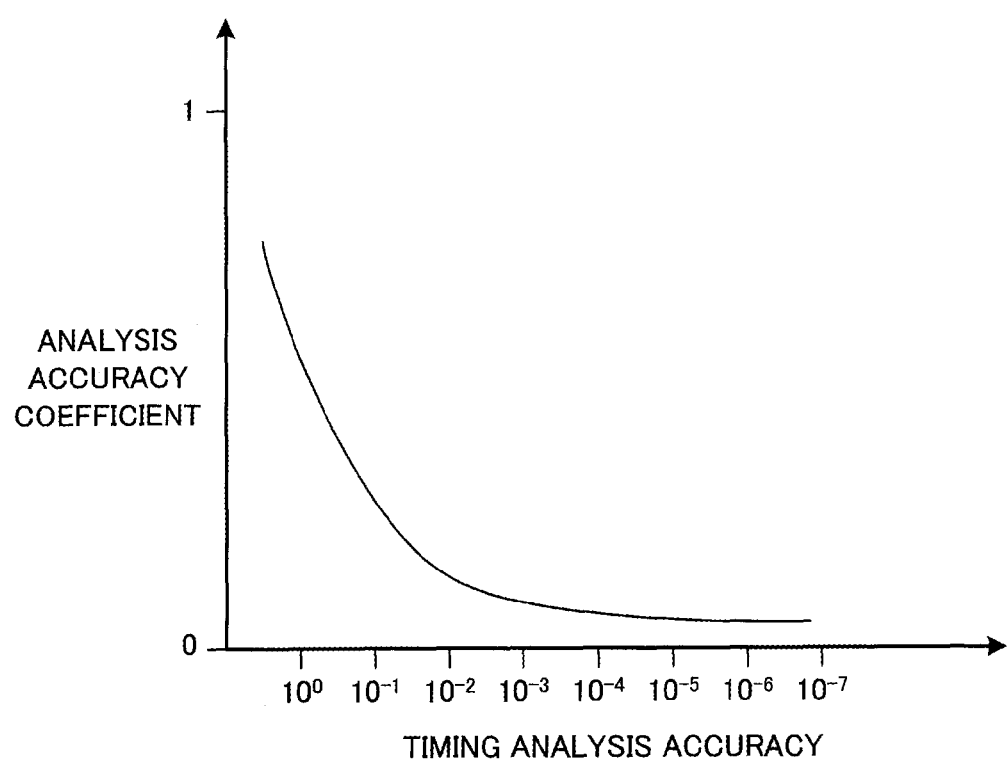
FIG. 12 illustrates an example of the relationship between the analysis accuracy and the analysis accuracy coefficient.

FIG. 12 illustrates an example of the relationship between the analysis accuracy and the analysis accuracy coefficient. In the graph of FIG. 12 in which the horizontal axis represents the timing analysis accuracy and the vertical axis represents the analysis accuracy coefficient, an example of the analysis accuracy coefficient corresponding to the accuracy of the timing analysis is illustrated. The timing analysis accuracy is the analysis accuracy with respect to the delay time (seconds) of the operation timing, for example. The analysis accuracy increases as the analyzable unit of delay time decreases. Accordingly, in the example of FIG. 12, the analysis accuracy coefficient decreases as the value of the timing analysis accuracy decreases.

The user who designs a circuit stores an analysis accuracy coefficient to be used for simplifying a circuit model in the coefficient storage unit 130, in view of the relationship between the timing analysis accuracy and the analysis accuracy coefficient illustrated in FIG. 12.

Figure 13:
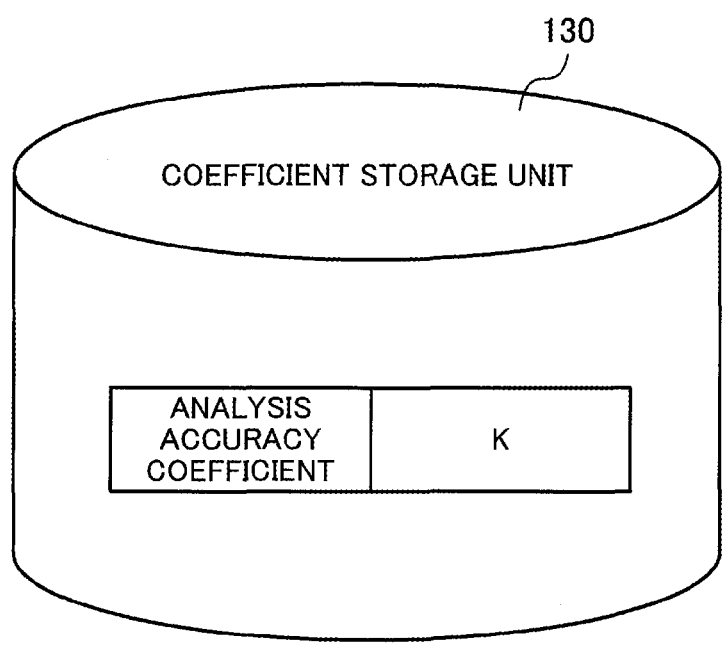
FIG. 13 illustrates an example of the data structure of a coefficient storage unit.

FIG. 13 illustrates an example of the data structure of the coefficient storage unit 130. In the coefficient storage unit 130, an analysis accuracy coefficient corresponding to the analysis accuracy needed for timing analysis is set. When the analysis accuracy coefficient is set, it becomes possible to appropriately perform timing analysis in accordance with the needed analysis accuracy for each netlist.

Next, simplification of the circuit model by the design support unit 140 using an analysis accuracy coefficient will be described.

The design support unit 140 first obtains the circuit information file 121 containing data of a circuit model from the circuit model storage unit 120, and interprets the circuit information file 121 so as to generate circuit information used for simplification. The circuit information is stored in the circuit information storage unit 142 as internal data of the design support unit 140.

Figure 14:
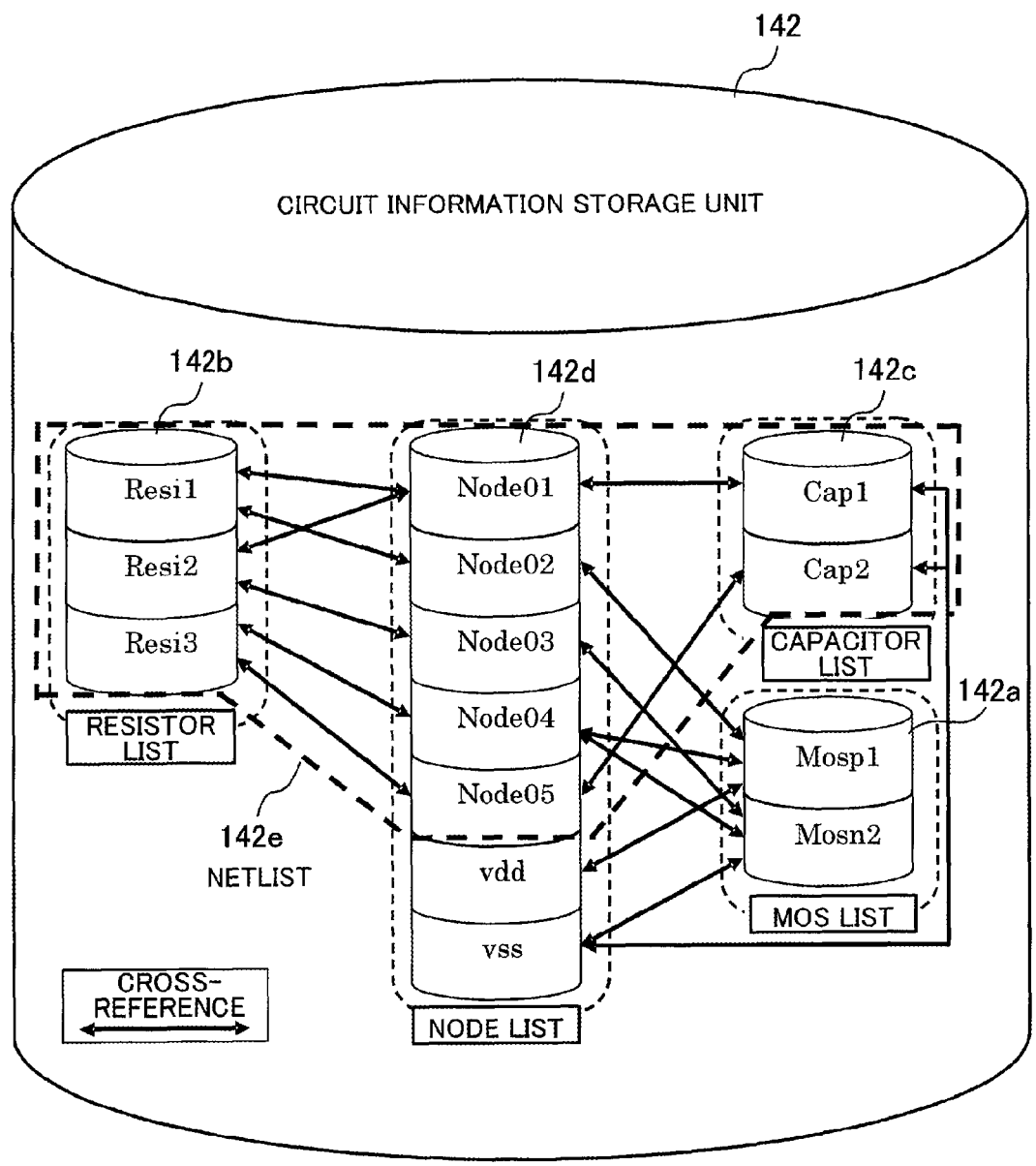
FIG. 14 illustrates an example of the data structure of circuit information in a circuit information storage unit.

FIG. 14 illustrates an example of the data structure of the circuit information in the circuit information storage unit 142. The circuit information includes data of each element. The element data includes a MOS list 142a, a resistor list 142b, a capacitor list 142c, and so on, for example. The MOS list 142a is a list of transistors included in the circuit model. The MOS list 142a stores identification information of each transistor. The identification information of the transistor is associated with identification information of each of nodes to which terminals of the transistor are connected, or is associated with a power source type. The resistor list 142b is a list of resistors included in the circuit model. The resistor list 142b stores identification information of each resistor. The identification information of the resistor is associated with identification information of each of nodes to which terminals of the resistor are connected, or is associated with a power source type. The capacitor list 142c is a list of capacitive elements included in the circuit model. The capacitor list 142c stores identification information of each capacitive element. The identification information of the capacitive element is associated with identification information of each of nodes to which terminals of the capacitive element are connected, or is associated with a power source type. A node list 142d is a list of nodes and power sources included in the circuit model. The node list 142d stores identification information of each node and identification information of each power source. The identification information of each node or power source is associated with identification information of an element connected to the node or power source.

In FIG. 14, associated pieces of identification information are connected with an arrow. The associated pieces of identification information may be cross-referenced. In other words, on the basis of a piece of information, another piece of information associated thereto may be referred to.

Among pieces of identification information of elements and nodes included in the circuit information, a set of pieces of identification information that are directly or indirectly associated to each other without having any identification information of a transistor therebetween represents a netlist 142e.

Next, the procedure of a circuit model simplification process performed in the design support unit 140 will be described.

Figure 15:
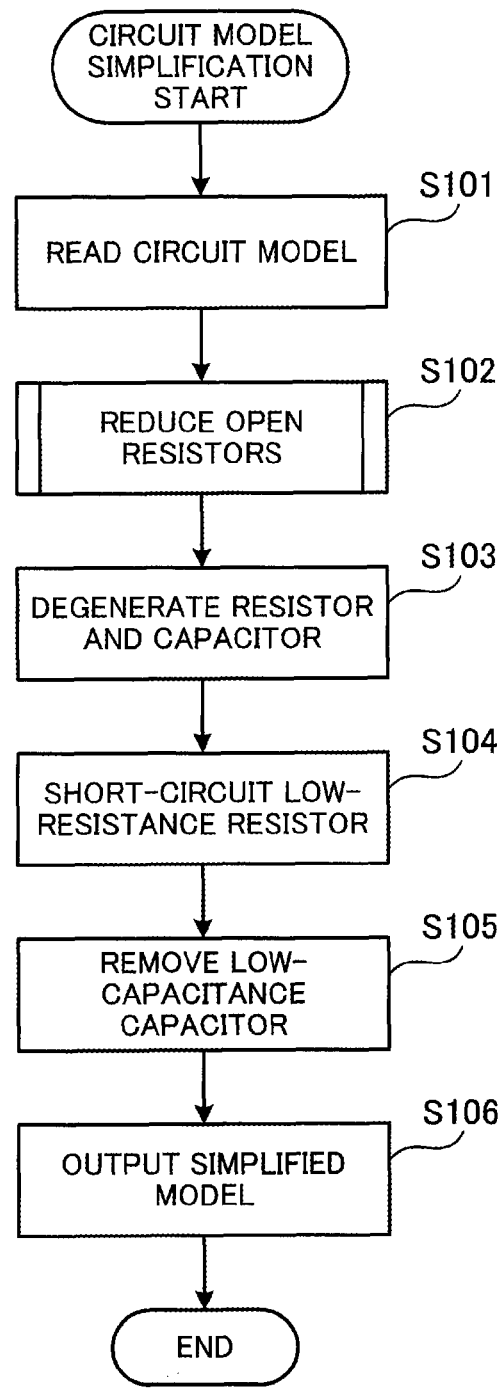
FIG. 15 is a flowchart illustrating an exemplary procedure of a circuit model simplification process.

FIG. 15 is a flowchart illustrating an exemplary procedure of a circuit model simplification process.

(Step S101) The model reading unit 141 reads a circuit model from the circuit model storage unit 120. For example, the model reading unit 141 reads the circuit information file 121 from the circuit model storage unit 120, and obtains data from the circuit information file 121. The model reading unit 141 interprets the circuit model on the basis of the obtained data, and generates circuit information as internal data. Then, the model reading unit 141 stores the generated circuit information in the circuit information storage unit 142.

(Step S102) The open-resistor reducing unit 143 reduces the number of open resistors in the circuit model. Note that this process will be described below in greater detail (see FIG. 16). The open-resistor reducing unit 143 updates the circuit information in the circuit information storage unit 142 on the basis of the result of the reduction in the number of open resistors.

(Step S103) The degenerating unit 144 degenerates resistors and capacitive elements that may be degenerated in the circuit model. Degeneration of resistors is performed in the manner illustrated in FIG. 3. Degeneration of capacitive elements may be performed in the same manner as degeneration of resistors. For example, a plurality of parallel-connected capacitive elements may be replaced with a single capacitive element having a capacitance equal to the combined resistance of the plurality of capacitive elements. Similarly, a plurality of serial-connected capacitive elements may be replaced with a single capacitive element having a capacitance equal to the combined resistance of the plurality of capacitive elements. The degenerating unit 144 updates the circuit information in the circuit information storage unit 142 on the basis of the result of the degeneration of the resistors and capacitive elements.

(Step S104) The low-resistance-resistor short-circuiting unit 145 short-circuits a resistor having a low resistance, among resistors included in the circuit model. The resistor having a low resistance is a resistor having a resistance less than a predetermined value that is set in advance, for example. The low-resistance-resistor short-circuiting unit 145 updates the circuit information in the circuit information storage unit 142 on the basis of the result of the short-circuiting of the low-resistance resistor.

(Step S105) The low-capacitance-capacitor removing unit 146 removes a capacitive element having a low electric capacitance, from among capacitive elements included in the circuit model. The capacitive element having a low electric capacitance is a capacitive element having an electric capacitance less than a predetermined value that is set in advance, for example. The low-capacitance-capacitor removing unit 146 updates the circuit information in the circuit information storage unit 142 on the basis of the result of removal of the low-capacitance capacitive element.

(Step S106) The model output unit 147 outputs, as a simplified model, the circuit information stored in the circuit information storage unit 142 after completion of the reduction of the number of open resistors, degeneration of the resistors and capacitive elements, short-circuiting of the low-resistance resistor, and removal of the low-capacitance capacitor. For example, the model output unit 147 stores the circuit information in the simplified model storage unit 150.

In this way, the simplified model obtained by simplifying the circuit model is generated. Next, the procedure of an open-resistor reduction process will be described.

Figure 16:
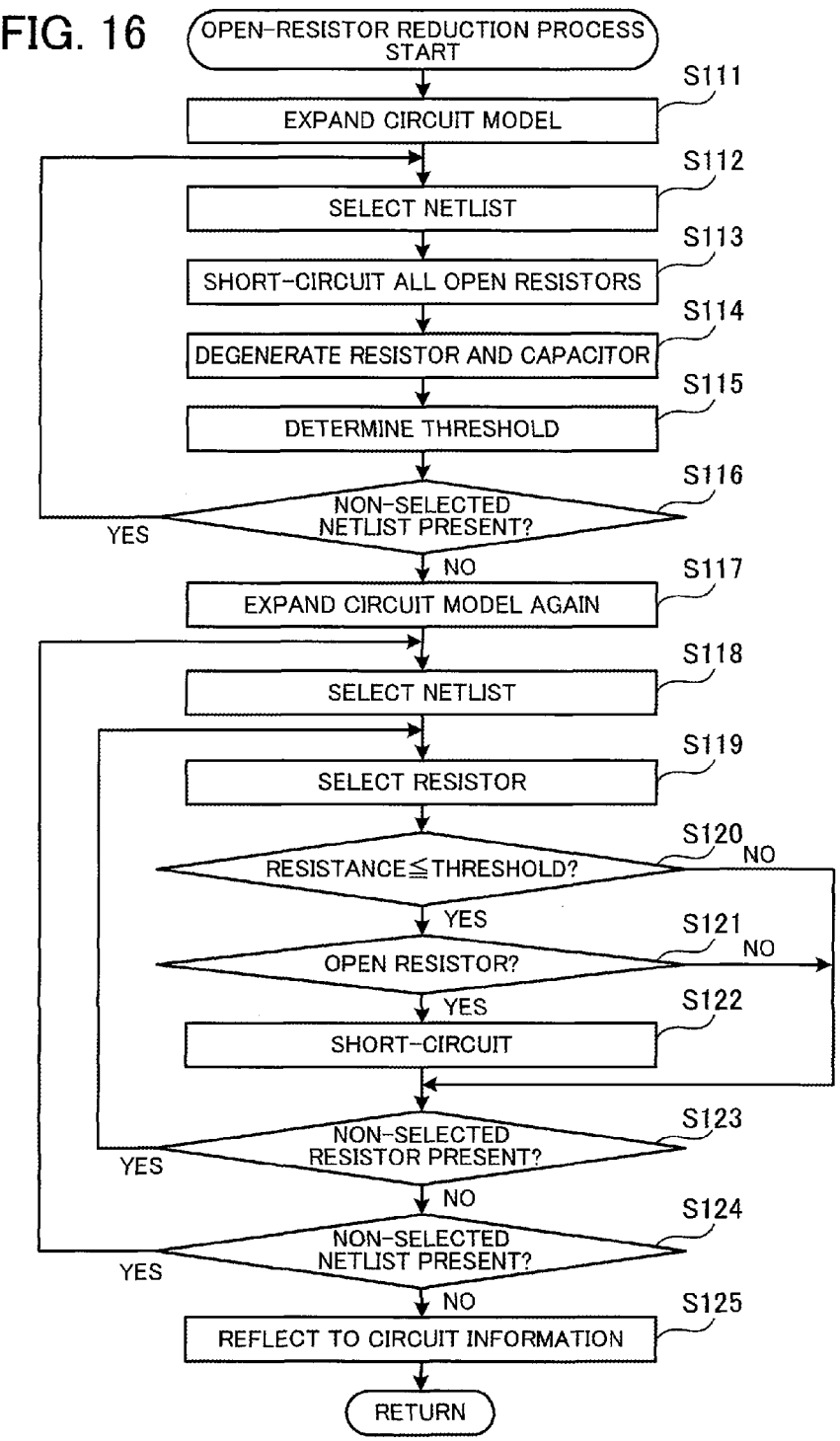
FIG. 16 is a flowchart illustrating an exemplary procedure of an open-resistor reduction process.

FIG. 16 is a flowchart illustrating an exemplary procedure of an open-resistor reduction process.

(Step S111) The open-resistor reducing unit 143 expands a circuit model. For example, the open-resistor reducing unit 143 obtains circuit information from the circuit information storage unit 142, and reproduces a circuit model in an area of the RAM 102.

(Step S112) The open-resistor reducing unit 143 selects a netlist that is not yet selected from the circuit model.

(Step S113) The open-resistor reducing unit 143 short-circuits all the open resistors, among resistors in the selected netlist. For example, the open-resistor reducing unit 143 selects one resistor from the selected netlist. Then, the open-resistor reducing unit 143 determines whether the selected resistor has an open end. For example, if identification information of the resistor in the resistor list included in the circuit information is associated with only a single piece of identification information, the selected resistor is determined to be an open resistor. If the selected resistor is an open resistor, the open-resistor reducing unit 143 short-circuits the resistor in the circuit model. In this way, in step S113, if the resistor is determined to be open, the resistor is short-circuited regardless of the level of resistance.

(Step S114) The open-resistor reducing unit 143 degenerates resistors and capacitive elements of the selected netlist.

(Step S115) The open-resistor reducing unit 143 determines a threshold on the basis of the netlist after the short-circuiting of open resistors and the degeneration of resistors and capacitive elements are performed. For example, the open-resistor reducing unit 143 calculates an approximate resistance of the netlist. Then, the open-resistor reducing unit 143 multiplies the approximate resistance by an analysis accuracy coefficient based on the accuracy of timing analysis, and sets the multiplication result as the threshold. The approximate resistance may be the highest resistance among the resistances of the resistors remaining in the netlist after the short-circuiting of all the open resistors and the degeneration of resistors and capacitive elements in the list are performed, for example.

Figure 17:
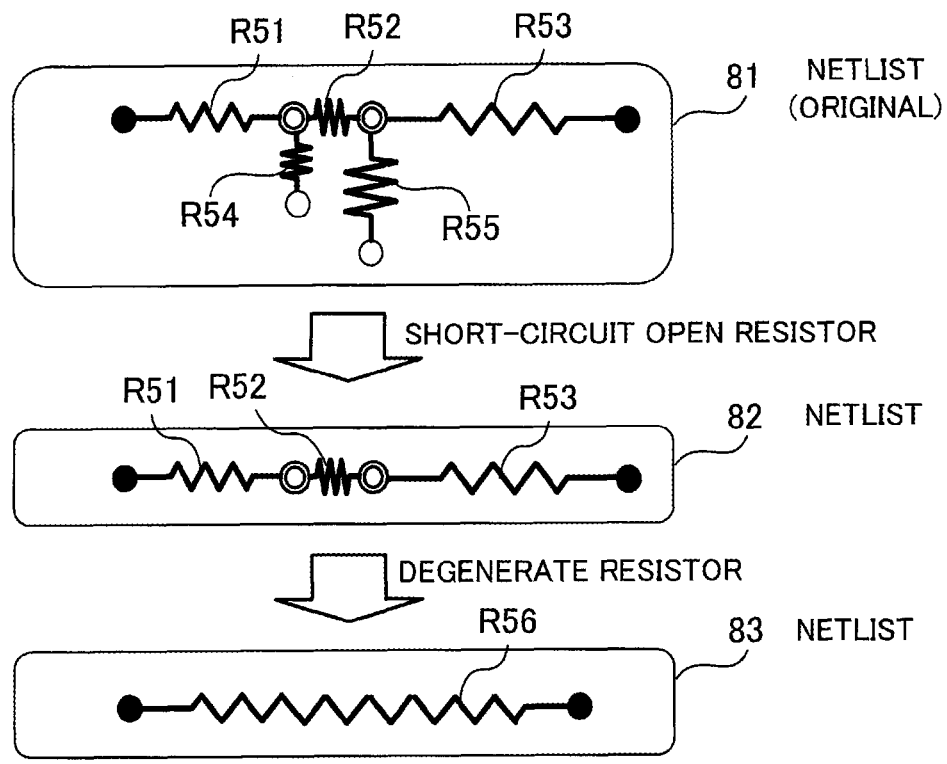
FIG. 17 illustrates a first example of determining an approximate resistance.

FIG. 17 illustrates a first example of determining an approximate resistance. In an original netlist 81 of FIG. 17, there are two points that are connected to transistors (in FIG. 17, there are two black circles each indicating a node connected to a transistor).

Upon determining a threshold, all the open resistors R54 and R55 are first short-circuited regardless of the level of resistance, among resistors R51 through R55 included in the original netlist 81. Then, a resistor degeneration process is performed on a netlist 82 obtained after the short-circuiting of open resistors. In the example of FIG. 17, the three resistors R51 through R53 included in the netlist 82 are connected in series. Accordingly, the three resistors R51 through R53 are replaced with a single resistor R56 by a degeneration process. As a result, there is only one resistor R56 in a netlist 83 obtained after the degeneration.

In this way, in the case where the resistors R51 through R55 in the netlist 81 are combined into a single resistor R56, the resistance of the resistor R56 is determined as the approximate resistance of the netlist 81. Note that the resistance of the resistor R56 is equal to the combined resistance of the resistors R51 through R53.

In the case where a plurality of resistors remain even after degeneration of resistors, the highest resistance among resistances of the respective remaining resistors (the combined resistance if the resistors are degenerated) is determined as the approximate resistance.

Figure 18:
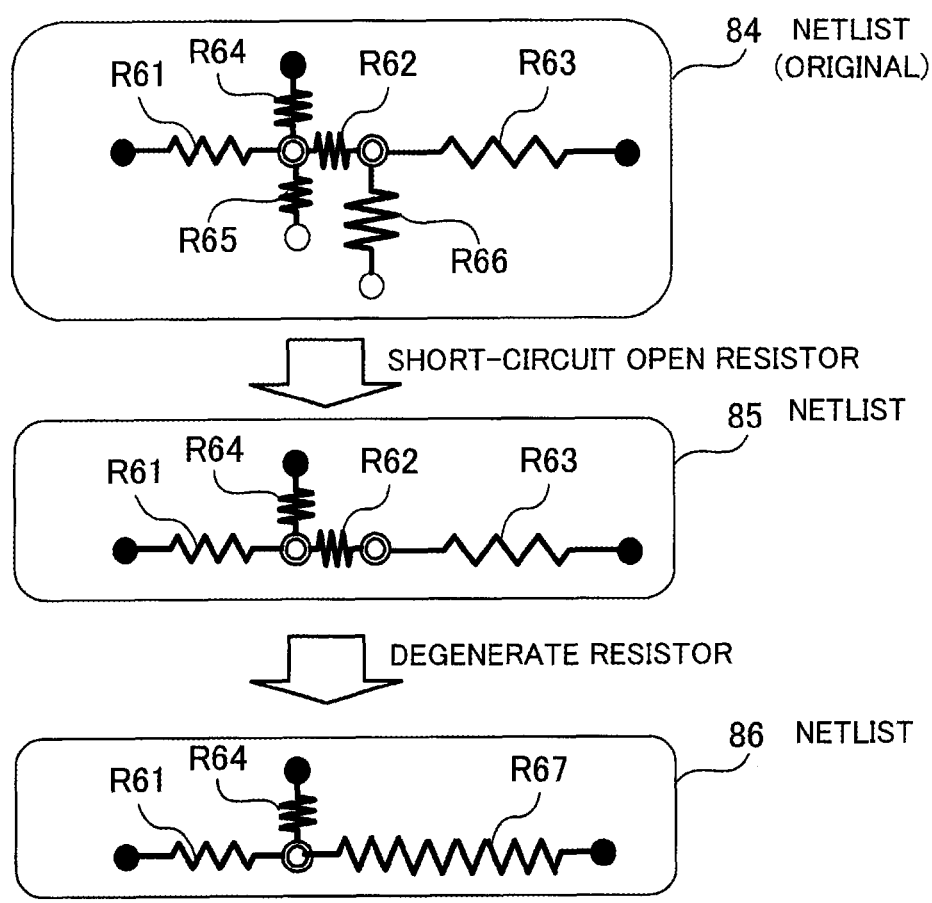
FIG. 18 illustrates a second example of determining an approximate resistance.

FIG. 18 illustrates a second example of determining an approximate resistance. In an original netlist 84 of FIG. 18, there are three points that are connected to transistors (in FIG. 18, there are three black circles each indicating a node connected to a transistor).

When a process of short-circuiting open resistors is performed on the netlist 84, open resistors R65 and R66 are short-circuited among resistors R61 through R66 included in the netlist 81. Then, a resistor degeneration process is performed on a netlist 85 after the short-circuiting of open resistors. In the example of FIG. 18, the two resistors R62 and R63 included in the netlist 85 are connected in series. Accordingly, the two resistors R62 and R63 are replaced with a single resistor R67 by the degeneration process. As a result, three resistors R61, R64, and R67 remain in a netlist 86 after the degeneration. Further degeneration of the netlist 86 is not possible. Thus, the resistances of the three resistors R61, R64, and R67 are compared with each other, and the highest resistance is determined as the approximate resistance of the netlist 84.

There are other methods of determining an approximate resistance which may be used when resistors are not combined into a single resistor. For example, in the case where a netlist is connected to three or more transistors, the netlist includes three or more nodes connected to the transistors. In this case, the three or more nodes are paired to form node pairs, and a node-to-node resistance of each node pair may be calculated. Then, the highest resistance among the node-to-node resistances of the respective node pairs may be determined as the approximate resistance of the netlist.

When the approximate resistance is calculated, the open-resistor reducing unit 143 calculates a threshold to be applied to the selected netlist for determining whether to short-circuit an open resistor. For example, the open-resistor reducing unit 143 multiplies the approximate resistance of the netlist by the analysis accuracy coefficient of the netlist that is determined on the basis of the accuracy needed for timing analysis. Then, the open-resistor reducing unit 143 sets the multiplication result as the threshold. The threshold may be calculated by the following equation:

$$\text{Threshold} = \text{Approximate Resistance of Netlist} \times K$$

in which $K$ $(0<K<1)$ is an analysis accuracy coefficient applied to the netlist.

Figure 19:
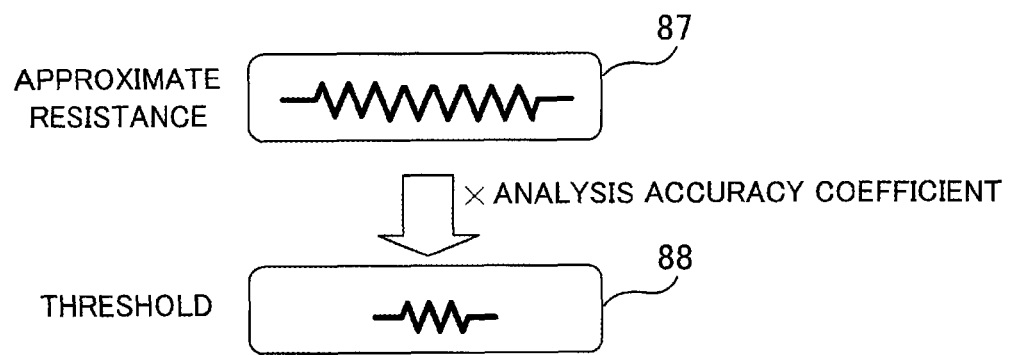
FIG. 19 illustrates an example of calculating a threshold.

FIG. 19 illustrates an example of calculating a threshold. In FIG. 19, an approximate resistance 87 and a threshold 88 are represented by the size of the respective resistors. Since the analysis accuracy coefficient is a value less than 1, the value of threshold 88 obtained by multiplying the approximate resistance 87 by the analysis accuracy coefficient is less than the approximate resistance 87. As the analysis accuracy coefficient decreases, the threshold 88 decreases. As the threshold 88 decreases, the number of open resistors to be short-circuited among open resistors decreases. Thus, it becomes possible to perform timing analysis with high accuracy. On the other hand, as the analysis accuracy coefficient increases, the threshold 88 increases, and more resistors are short-circuited. Thus, it becomes possible to perform timing analysis with higher efficiency.

In this way, the threshold for determining the necessity of short-circuiting an open resistor is determined for the selected netlist. When the threshold is determined, the open-resistor reducing unit 143 stores the determined threshold in association with the selected netlist in a storage medium such as the RAM 102 or the like.

Referring back to FIG. 16, a further description of the open-resistor reduction process will be given.

(Step S116) The open-resistor reducing unit 143 determines whether there is a netlist that is not yet selected. If there is a netlist that is not yet selected, the process returns to step S112. If all the netlists are already selected, the open-resistor reducing unit 143 places all the netlists back to a non-selected state. Then, the process proceeds to step S117.

(Step S117) The open-resistor reducing unit 143 expands a circuit model again. For example, the open-resistor reducing unit 143 deletes the circuit model expanded in step S111 from the RAM 102. Then, the open-resistor reducing unit 143 reads circuit information from the circuit information storage unit 142, and expands a circuit model again in the RAM 102.

(Step S118) The open-resistor reducing unit 143 selects one of netlists that are not yet selected.

(Step S119) The open-resistor reducing unit 143 selects one resistor in the selected netlist.

(Step S120) The open-resistor reducing unit 143 compares a resistance of the selected resistor with the threshold applied to the selected netlist. Then, the open-resistor reducing unit 143 determines whether the resistance of the resistor is less than or equal to the threshold. If the resistance is less than or equal to the threshold, the process proceeds to step S121. If the resistance is greater than the threshold, the process proceeds to step S123.

(Step S121) If the resistance of the selected resistor is less than or equal to the threshold, the open-resistor reducing unit 143 determines whether the resistor is an open resistor. If the resistor is open, the process proceeds to step S122. If the resistor is not open, the process proceeds to step S123.

(Step S122) The open-resistor reducing unit 143 short-circuits the selected resistor.

(Step S123) The open-resistor reducing unit 143 determines whether there is a resistor that is not yet selected in the selected netlist. If there is a resistor that is not yet selected, the process returns to step S119. If all the resistors are already selected, the process proceeds to step S124.

With the operations of steps S119 through S123, open resistors having resistances less than the threshold are short-circuited, among resistors in the selected netlist.

Figure 20:
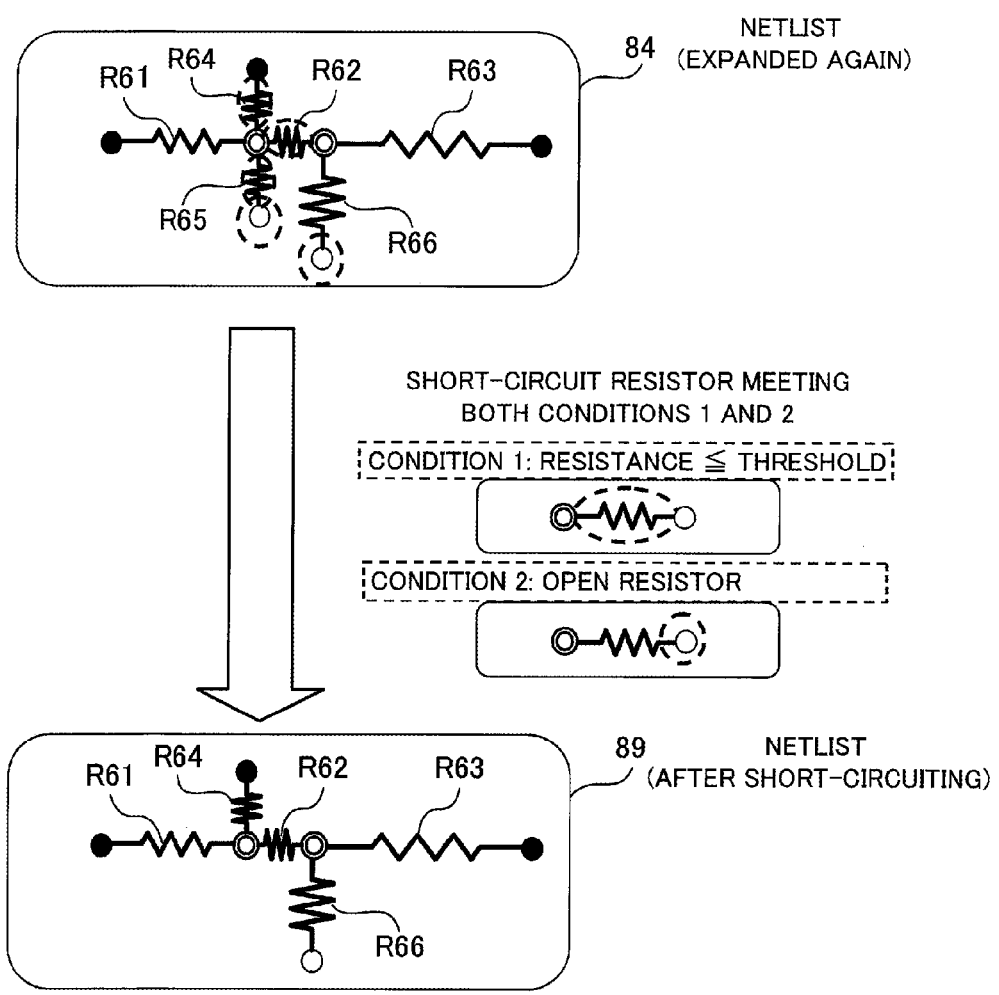
FIG. 20 illustrates an example of reducing the number of open resistors in a netlist.

FIG. 20 illustrates an example of reducing the number of open resistors in a netlist. In the example of FIG. 20, the number of open resistors is reduced in the netlist 84 of FIG. 18. As illustrated in FIG. 18, the netlist 84 having subjected to processes such as short-circuiting of resistors and the like for calculation of a threshold is expanded again in the RAM 102 from the original circuit information in the circuit information storage unit 142. Then, resistors that meet conditions for short-circuiting are short-circuited. The conditions for short-circuiting include that the resistance is less than or equal to the threshold, and that the resistor is an open resistor.

In the netlist 84, the resistor R62, R64, and R65 have resistances less than or equal to the threshold. Among these resistors R62, R64, and R65, only the resistor R65 is an open resistor. Accordingly, the resistor R65 is short-circuited, and removed from the netlist 84. Then, a netlist 89 after the short-circuiting is generated.

Referring back to FIG. 16, a further description of the open-resistor reduction process will be given.

(Step S124) If determination as to the necessity of short-circuiting is made for all the resistors in the selected netlist, the open-resistor reducing unit 143 determines whether there is a netlist that is not yet selected. If there is a netlist that is not yet selected, the process returns to step S118. If all the netlists are already selected, the process proceeds to step S125.

(Step S125) If short-circuiting of open resistors having resistances less than or equal to a threshold is completed for all the netlists, the open-resistor reducing unit 143 reflects the contents of the expanded circuit model to the circuit information in the circuit information storage unit 142.

In this way, the number of open resistors is reduced in each netlist. Then, degeneration of resistors and capacitive elements, short-circuiting of low-resistance resistors, and the like are performed on the entire circuit model.

Figure 21:
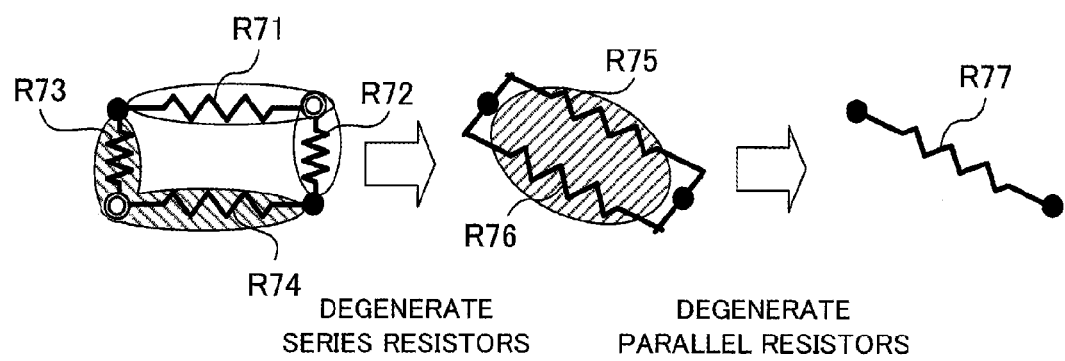
FIG. 21 illustrates an example of a process of degenerating resistors.

FIG. 21 illustrates an example of a process of degenerating resistors. As illustrated in FIG. 21, resistors are degenerated in accordance with the Ohm's law. For example, series-connected resistors R71 and R72 are degenerated into a resistor R75 having a resistance equal to their combined resistance. Similarly, series-connected resistors R73 and R74 are degenerated into a resistor R76 having a resistance equal to their combined resistance. In the example of FIG. 21, the resistors R75 and R76 generated by the degeneration of series resistors are connected in parallel. Thus, the resistors R75 and R76 are degenerated into a resistor R77 having a resistance equal to their combined resistance by a process of degenerating parallel resistors.

Figure 22:
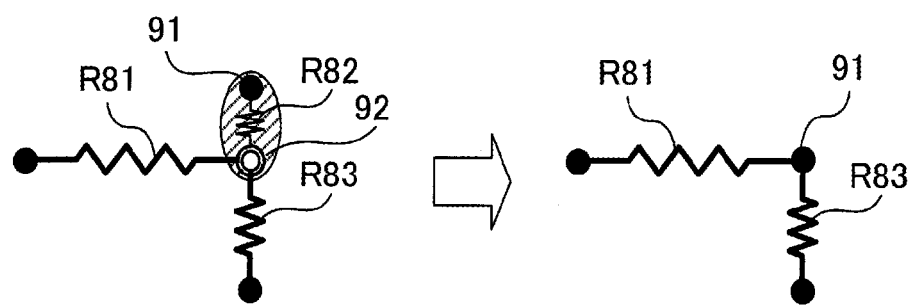
FIG. 22 illustrates an example of a process of short-circuiting a low-resistance resistor.

FIG. 22 illustrates an example of a process of short-circuiting a low-resistance resistor. In the example of FIG. 22, among three resistors R81 through R83, only the resistor R82 is a low-resistance resistor having a resistance less than a predetermined value. In this case, the resistor R82 is short-circuited. Note that the resistor R82 is not an open resistor. The terminals of the resistor R82 are connected to two nodes 91 and 92, respectively. Of these, the node 91 is connected to a transistor. If the resistor R82 is short-circuited, the node 91 is moved to the location of the node 92.

Note that although a process of short-circuiting a low-resistance resistor is illustrated in FIG. 22, a process of short-circuiting a low-capacitance capacitor may be performed in the same manner. When the process of simplifying a circuit model described above is completed, circuit information in the circuit information storage unit 142 is updated on the basis of the simplified circuit model. Then, the circuit information is output to the simplified model storage unit 150. For example, a file in the same format as the circuit information file 121 (see FIG. 11) is stored in the simplified model storage unit 150.

In this way, in the second embodiment, a threshold for determining the necessity of short-circuiting a netlist is calculated, and resistors having resistances less than or equal to the threshold are short-circuited. As a result, the circuit model is appropriately simplified in accordance with the analysis accuracy needed for timing analysis. That is, the degeneration rate is improved and the time take to perform timing analysis is reduced by short-circuiting open resistors. Meanwhile, open resistors that greatly affect the timing analysis remain in the circuit model. Thus, the accuracy of timing analysis is prevented from decreasing.

Further, in the second embodiment, the threshold for determining the necessity of short-circuiting an open circuit is calculated from the analysis accuracy coefficient and the approximate resistance of the circuit. Thus, the user may set an appropriate threshold by simply specifying an analysis accuracy coefficient, without being conscious of the level of the resistance in the circuit. Thus, the load on the user is reduced.

In particular, in the second embodiment, a threshold is determined for each netlist. Therefore, even if the analysis accuracy differs between the netlists, it is possible to set an appropriate threshold for each netlist. If the user individually sets a threshold for each netlist, a significant load is imposed on the user. In the second embodiment, an appropriate threshold may be set for each list by simply specifying an analysis accuracy coefficient. Therefore, the load on the user is very low.

In the second embodiment, simplification of a circuit model for performing timing analysis is illustrated. However, such simplification of a circuit model may be performed for other analysis than timing analysis. In the case of performing other analysis than timing analysis, it is possible to appropriately simplify the circuit model by setting an analysis accuracy coefficient corresponding to the accuracy of the analysis.

According to an aspect, it is possible to appropriately simplify a circuit model in accordance with the analysis accuracy.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A design support apparatus comprising:
a memory configured to store a circuit model representing a circuit; and
a processor configured to perform a procedure including:
detecting a resistor whose terminals are open except one terminal and which has a resistance less than or equal to a threshold, from among resistors included in the circuit model in the memory;
removing the detected resistor from the circuit model in the memory; and
determining the threshold on the basis of an analysis accuracy in behavior simulation of the circuit using the circuit model.

2. The design support apparatus according to claim 1, wherein the determining includes reducing the threshold as the analysis accuracy increases.

3. The design support apparatus according to claim 1, wherein:
the determining includes determining, for each one or more partial circuits included in the circuit model, the threshold in accordance with a circuit configuration of the partial circuit; and
the detecting includes detecting the resistor whose terminals are open except one terminal and which has a resistance less than or equal to the threshold determined for the partial circuit that includes the resistor.

4. The design support apparatus according to claim 3, wherein:
the determining includes multiplying a value calculated on the basis of the resistance in the partial circuit by a coefficient that is defined in accordance with an analysis accuracy needed for the behavior simulation of the circuit, and setting a result of the multiplication as the threshold for the partial circuit.

5. The design support apparatus according to claim 4, wherein the determining includes comparing a combined resistance of a plurality of resistors that are connected in parallel or series, with respective resistances of resistors that are not connected in parallel or series, under a condition that all the resistors whose terminals are open except one terminal are removed, multiplying a highest resistance among the compared combined resistance and resistances by the coefficient, and setting a result of the multiplication as the threshold for the partial circuit.

6. A design support method comprising:
detecting, by a processor, a resistor whose terminals are open except one terminal and which has a resistance less than or equal to a threshold, from among resistors included in a circuit model, stored in a memory, representing a circuit;
removing, by the processor, the detected resistor from the circuit model in the memory; and
determining the threshold on the basis of an analysis accuracy in behavior simulation of the circuit using the circuit model.

7. A non-transitory computer-readable storage medium storing a computer program, the computer program causing a computer to perform a procedure comprising:
detecting a resistor whose terminals are open except one terminal and which has a resistance less than or equal to a threshold, from among resistors included in a circuit model, stored in a memory, representing a circuit;
removing the detected resistor from the circuit model in the memory; and
determining the threshold on the basis of an analysis accuracy in behavior simulation of the circuit using the circuit model.

* * * * *